United States Patent
Clemens et al.

(10) Patent No.: US 7,526,526 B2
(45) Date of Patent: Apr. 28, 2009

(54) SYSTEM AND METHOD FOR TRANSFERRING DATA

(75) Inventors: Robert P. Clemens, West Chester, PA (US); John G. Garczynski, Jr., Gilbertsville, PA (US)

(73) Assignee: Aviom, Inc., West Chester, PA (US)

( * ) Notice: Subject to any disclaimer, the term of this patent is extended or adjusted under 35 U.S.C. 154(b) by 254 days.

(21) Appl. No.: 11/538,600

(22) Filed: Oct. 4, 2006

(65) Prior Publication Data

US 2007/0086475 A1 Apr. 19, 2007

Related U.S. Application Data

(63) Continuation of application No. 11/252,577, filed on Oct. 18, 2005.

(60) Provisional application No. 60/724,307, filed on Oct. 6, 2005.

(51) Int. Cl.
- G06F 15/16 (2006.01)
- G06F 11/00 (2006.01)
- H04B 7/005 (2006.01)
- H04L 12/28 (2006.01)
- G08C 25/02 (2006.01)

(52) U.S. Cl. .............. 709/208; 370/278; 370/389; 709/203; 714/748; 714/48; 714/53

(58) Field of Classification Search ............ 709/203, 709/200, 208, 209, 278; 370/389, 392, 396, 370/400, 282, 278; 714/48, 18, 21, 30, 39, 714/43, 52, 57, 748
See application file for complete search history.

(56) References Cited

U.S. PATENT DOCUMENTS

| | | | |
|---|---|---|---|
| 5,315,057 A | 5/1994 | Land et al. | |
| 5,655,025 A | 8/1997 | Kim et al. | |
| 5,852,405 A | 12/1998 | Yoneda et al. | |
| 5,995,512 A | 11/1999 | Pogue, Jr. | |
| 6,016,559 A * | 1/2000 | Kim ........................... | 714/48 |
| 6,414,945 B1 | 7/2002 | Chennakeshu et al. | |
| 6,944,148 B1 | 9/2005 | Gehring et al. | |
| 7,089,338 B1 * | 8/2006 | Wooten et al. .............. | 710/110 |
| 7,158,561 B2 * | 1/2007 | Fujii et al. .................. | 375/219 |
| 7,302,509 B2 * | 11/2007 | Montalvo et al. ........... | 710/110 |
| 2001/0022787 A1 | 9/2001 | Mchale | |
| 2003/0050989 A1 | 3/2003 | Marinescu | |
| 2003/0223409 A1 | 12/2003 | Wiebe | |
| 2004/0100275 A1 | 5/2004 | Shin | |
| 2004/0114607 A1 | 6/2004 | Shay et al. | |
| 2004/0175993 A1 | 9/2004 | Chennakeshu | |
| 2005/0053243 A1 | 3/2005 | Ganton | |
| 2005/0226430 A1 | 10/2005 | Kreifeldt et al. | |
| 2006/0083259 A1 | 4/2006 | Metcalf et al. | |

* cited by examiner

Primary Examiner—Hanh Nguyen
(74) Attorney, Agent, or Firm—Pepper Hamilton LLP

(57) ABSTRACT

Methods for synchronously transmitting control data from a first device to a second device in a streaming data network and for transferring non-addressed data through a streaming data network are disclosed. A first device may insert an identifier identifying a second device into data packets transmitted over a streaming data network. A first acknowledgement may be received from the second device at the first device. At least a portion of the control data may be inserted into the data packets at least until a second acknowledgement is received at the first device. The previous step may be repeated with additional portions of the of the control data until all control data has been transmitted to the second device. The identifier may then be removed from the data packets at least until a third acknowledgment is received at the first device.

14 Claims, 15 Drawing Sheets

SYSTEM AND METHOD FOR TRANSFERRING DATA

CLAIM OF PRIORITY AND RELATED APPLICATIONS

This application is a continuation of and claims priority to pending U.S. application Ser. No. 11,252,577 to Metcalf, et al., entitled "Packet-Based Systems and Methods for Distributing Data" and filed Oct. 18, 2005, and claims priority to U.S. Provisional Application Ser. No. 60/724,307, entitled "A-Net G2 Design Specification" and filed Oct. 6, 2005, each of which is incorporated herein by reference in its entirety.

BACKGROUND

Various audio and video system manufactures have attempted to provide a multi-channel networking system of audio and/or video devices, where digital audio can be inserted and extracted at various locations within the network. Typically, such systems have routed digital audio as data in a standard Ethernet switched-packet network. While such approaches take advantage of readily available components, they do not perform adequately for real-time streaming media for a number of reasons.

For example, most switched packet systems require a star topology, where every device is connected to a central "server." As such, every device requires a separate cable connecting it to the server. This is a sub-optimal configuration, due to cable cost and other considerations, when multiple devices are located in close proximity, but are separated from the server by a great distance.

Additionally, in some cases, it is preferable to have the audio data available at every location within a networking system. Thus, systems have been developed where data flows bi-directionally from an input device. In some cases, it could be desirable to use a star-topology where several devices are connected to a "hub" that is centrally located. In order for traditional devices to support bi-directional transfer of audio data, the routing of this data must be handled at a very high application layer, adding delay, or latency, which is undesirable in real-time performance situations. For example, it is not unusual for professional or high skilled musicians to discern very slight delays in audio processing (as small as 1 ms), which can cause performance problems. Traditional systems that support bi-directional data passing at lower layer revert to being unidirectional when they encounter a standard Ethernet switch.

Another advantage of bi-directional systems is that the user need not be aware of whether a device is "upstream" or "downstream" from another device. As such, all devices appear equal in the system.

Moreover, conventional Ethernet packets can only be routed from one port to another in a contiguous form. Such a packet cannot add new data from additional ports during transmission to update the data packet. As such, existing digital networking systems either become unidirectional when an Ethernet switch is encountered or add considerable latency as the channel data is merged as the application layer and re-inserted into the networking system.

Existing digital systems support a very narrow range of sample rate clocks or require a dedicated hardware clock signal for system synchronization. If analog audio data is introduced and the conversion to digital is synchronous with the network clock, this solution may be sufficient. However, when digital audio is introduced to the system, the data will be asynchronous with respect to an independent network clock. Therefore, the data must be sample-rate-converted to match the network clock. This is undesirable because (i) the sample rate conversion introduces delay to the signal; (ii) sample rate conversion add additional cost to the system and (iii) sample rate converts have to convert the raw audio data to fit the desired timing by mathematically estimating new sample points that lie between the original samples. Accordingly, particularly for a professional audio application, sample rate conversion can result in an undesirable coloration of the input audio data.

A conventional professional audio system may require operation at different sample rates. For example, many systems operate at 48 kHz, 96 kHz, and/or 192 kHz. However, audio CDs are mastered at 44.1 kHz. As such, a system that can only operate at 48 kHz must use sample rate converters to obtain digital contents from audio CDs. Furthermore, systems that perform video post-production (where raw film is transferred to video, edited for audio content, and transferred back to film) must use "SMPTE pull-up" or "SMPTE pull-down" sample rates that can be as far as +/−4% from the original content rate. (This difference is required to accommodate the difference or video frame rates in film (24 frames per second) and video (29.97 frames per second).

In addition, some systems generate an audio sample clock based on the rate of transmitted packets. If timing errors are introduced using this approach, such errors can accumulate in devices that are serially connected in the network. As a result, jitter and wander (low-frequency jitter) may be introduced in the packet rate. Accordingly, jitter and wander can also occur in the audio sample rate, which can cause a digital network system to lose sample "lock," resulting in a loss of audio data.

In professional audio systems, it can also be necessary to slave the system to a continuously variable digital clock that may move slowly over a range. This is typically the case when the system is slaved to a tape deck that contains a recorded time code. Since the playback of the tape is subject to mechanical variations, the sample rate can fluctuate.

Typical networking systems can be used in setups where powered speaker systems are hung from rafters in an arena or stadium. For such setups DSP algorithms (e.g., for determining crossover frequencies, power output, time alignment between various speaker cones, etc.) might be required to be uploaded to the speaker prior to a performance. It can further be necessary to control DSP parameters in real-time. At the same time, it is often desirable to download telemetry data, such as temperature, impedance and power output, from these remote devices during operation. This non-audio data must be addressable to one, more or all of the devices in a networking system. Ideally, this non-audio data should be on the same wire as the audio data to avoid the extra cost of running wires simply for the command and status reporting requirements.

Some existing audio devices that use the MIDI standard for control employ an electrical connection that is limited to very short distances (50 feet or less) and point-to-point connections. In order to have multiple devices receive the same MIDI stream, a dedicated MIDI splitter or daisy-chained devices (at most 2-3 devices can be daisy-chained before data integrity is comprised) is currently required.

Accordingly, a need exists for networking systems supporting the transfer or audio and/or video data in devices arranged in any topology.

A need exists for networking systems that transmit audio and/or video data bi-directionally or in parallel.

A need exists for networking systems that transmit audio and/or video data using hubs that combine data from multiple inputs.

A need exists for networking systems to be connected in a manner that the connection of devices is not dependent on data flow.

A need exists for networking systems that merge data from different packets arriving on different data streams and output the merged data as a new stream with minimal latency.

A need exists for methods and systems for inserting new digital media into a network without using sample rate converters.

A need exists for networking systems that derive the master clock signal from each device from the network packet rate.

A need exists for audio networking systems that accommodate a broad range of sample rates.

A need exists for networking systems that minimize jitter when multiple network devices are connected in series.

A need exists for networking systems that accurately track a master clock that provide a variable sample rate.

A need exists for audio and/or vide networking systems that permit non-audio/video data to be transmitted.

A further need exists for networking systems that can route performance control data.

A further need exists for networking systems that permit a single MIDI device to be inserted into the audio network that allows control data to be routed up to 500 feet.

A still further need exists for networking systems that permit MIDI data to be read by any device on the network.

SUMMARY

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "signal" is a reference to one or more signals and equivalents thereof known to those skilled in the art, and so forth. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention.

In an embodiment, a method for synchronously transmitting control data from a master device to one of a plurality of slave devices in a streaming data network may include inserting an identifier identifying the slave device into a transmit data stream transmitted over a streaming data network, receiving a first acknowledgement via a receive data stream, inserting at least a portion of the control data into the transmit data stream at lease until a second acknowledgement is received via the receive data stream, repeating the second inserting step unit all of the control data has been transmitted to the slave device, and removing the identifier from the transmit data stream at least until a third acknowledgment is received via the receive data stream.

In an embodiment, a method of synchronously transmitting control data from one of a plurality of slave devices to a master device in a streaming data network may include inserting a first identifier identifying the slave device into a transmit data stream transmitted over a streaming data network, determining whether the first acknowledgement from the master device via a receive data stream, determining whether the first acknowledgment identifies the slave device, it not, removing the identifier from the transmit data stream, and is so inserting at least a portion of the control data into the transmit data stream at least until a second acknowledgement is received via the receive data stream, repeating the second inserting step until all of the control data has been transmitted to the master device, and removing the identifier from the transmit data stream at least until a third acknowledgment is received via the receive data stream.

In an embodiment, a system for synchronously transmitting control data in a streaming data network may include a master device and one or more slave devices. The master device may include a master data receiving module for receiving a receive data stream, and a master data insertion module for inserting an identifier identifying a slave device into a transmit data stream transmitted over the streaming data network, and inserting, once a first acknowledgment has been received via the receive data stream and while at least some control data has not been transmitted, at least a portion of the control data into the transmit data stream until a second acknowledgement is received via the receive data stream. Each slave device may include a slave data receiving module for receiving the transmit data stream, and a slave data insertion module for inserting the first acknowledgment into the receive data stream if an identifier identifying the slave device is received from the transmit data stream, and inserting the second acknowledgment into the receive data stream if data is received via the transmit data stream.

In an embodiment, a system for synchronously transmitting control data in a streaming data network may include one or more slave devices and a master device. Each slave device may include a slave data receiving module for receiving a receive data stream, and a slave data insertion module for inserting an identifier identifying the slave device into a transmit data stream transmitted over the streaming data network, and inserting, if a first acknowledgment identifying the slave device has been received via the receive data stream and while at least some control data has not been transmitted, at least a portion of the control data into the transmit data stream until a second acknowledgement is received via the receive data stream. The master device may include a master data receiving module for receiving the transmit data stream, and a master data insertion module for inserting a first acknowledgment into the receive data stream if an identifier identifying a slave device is received from the transmit data stream, and inserting the second acknowledgment into the receive data stream if data is received via the transmit data stream.

BRIEF DESCRIPTION OF THE DRAWINGS

Aspects, features benefits and advantages of the embodiments described herein will be apparent with regard to the following description, appended claims and accompanying drawings where:

DETAILED DESCRIPTION

Figure 1:
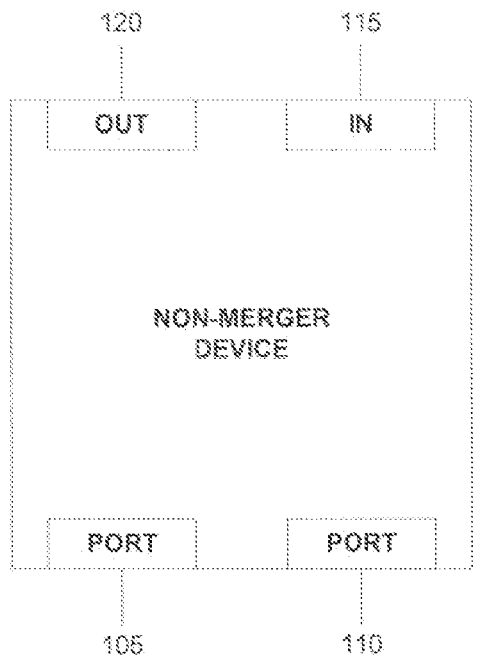
FIG. 1 depicts an exemplary non-merger device according to an embodiment.

A "channel" may refer to a physical connection. For example, a 16-channel audio input device may have 16 physical channels.

Each channel may be mapped into a "slot." Each slot may correspond to a location within a packet. In other words, a slot may not be a physical element.

A "serial run" may be formed when several non-mergers are connected in series. Serial runs may be connected to mergers like spokes of a wheel and/or between two mergers. Two mergers may also be directly connected to each other without any non-mergers between them.

A "non-merger device" or "non-merger" refers to a device having two ports used within a networking system according to an embodiment. The non-merger device may additionally have an input/output physical connection for receiving or transmitting data. In some cases, one port of a non-merger device in a networking system may not be connected to another device, such as the termination of a serial run. A more detailed description of a non-merger device is included below.

A "merger device" or "merger" refers to a device having three or more ports used within a networking system according to an embodiment. The merger device may additionally have an input/output physical connection for receiving or transmitting data. A more detailed description of a merger device is included below.

A "networking system" may include any combination of mergers and non-mergers totaling two or more nodes.

An "incoming data stream" refers to data received on an input port of a non-merger or merger device.

An "outgoing data stream" refers to data transmitted over an outgoing port of a non-merger or merger device.

The term "converting," when used with respect to data received from an input interface or data being sent to an output interface, may include, without limitation, analog-to-digital conversion, digital-to-analog conversion, slicing data into data segments of a particular length, and/or concatenating data into longer data segments.

A networking system and exemplary components, bus protocols, system setups, and the like are disclosed herein. In an embodiment, the networking system may be used to transmit, without limitation, audio data and/or video data. Audio data may be received in an analog and/or a digital format. A networking system may transmit, for example, up to 64 channels of 24-bit audio data and, optionally, up to 16 channels of 8-bit serial data. In an alternate embodiment, up to 128 channels of 24-bit audio data may be transferred. Alternate channel widths and alternate number of channels may be used within the scope of this disclosure.

In an embodiment, the networking system may include a plurality of nodes. Each node may receive data from an input interface and/or transmit data to an output interface. Received data may be converted from a format received from the input interface and reassembled into data slices having a width defined for the particular channel to which the data is assigned. This data may be inserted into a slot in a packet corresponding to the channel and having the appropriate data width.

In an embodiment, a node may receive incoming packets on a receive interface and insert information pertaining to channels assigned to the node into outgoing packets on a transmit interface. The outgoing packet may be, in some cases, a combination of the incoming packet and information pertaining to the data received by the node from its input interface (if any). In other cases, the node may overwrite control information and/or data in the incoming packet when generating the outgoing packet. Such cases will be described in detail below.

In an embodiment, all audio channels may be readable by all nodes in a networking system as a result of specific reading and writing operations. In an embodiment, the data for all of the channels may be transferred between nodes over a single cable, such as CAT-5 cable. Alternate cables may also be used within the scope of this disclosure.

Non-Mergers

In an embodiment, a node in a networking system may be a non-merger device, such as the device depicted in FIG. 1. A non-merger may have two ports 105, 100 by which it may be connected to a networking system. A non-merger may replace and/or add data received from an input interface 115 to an incoming packet received from a first port, such as 105, in order to generate an outgoing packet for one or both of its ports. In an embodiment, a non-merger may not combine a plurality of incoming packets into a single outgoing packet. A non-merger may transmit data received from an incoming packet via an output interface 120. In an embodiment, the data through the output interface 120 may be selected from one or more slots. In an embodiment, a user may select the one or more slots from which data is transmitted.

A non-merger may have two port designators. The port designators may pertain to physical ports 105, 110 on the non-merger. The ports 105, 110 may be referred to herein as "Port A" and "Port B." However, such designations are non-limiting. In an embodiment, a cable attached to one of the non-merger's ports may remotely power the non-merger.

In an embodiment, a non-merger may store incoming data received from one port and may write outgoing data to both ports. In an embodiment, the physical port from which data is stored may be changed using one or more commands received from a Control Master (discussed below in reference to FIG. 3) and/or by a user. The port from which data is stored may be called the "Main port," and the other port may be called the "Aux port." However, either of Port A or Port B may be designated the Main port, Such designation may be based on, for example, internal settings for the non-merger and/or the location of the non-merger in the networking system. In an embodiment, outgoing data may be restricted to only one of Port A and Port B. Such an embodiment may be used where unidirectional channels are required.

Each non-merger may receive and transmit, for example, digital sync, data (e.g., a system clock), analog audio data, digital audio data, serial data and/or control data. In an embodiment, one or more slots may be assigned to the non-merger for local data insertion. In an embodiment, no slot may be assigned to more than one node. The non-merger may set a Data Slot Source Flag corresponding to an assigned slot when the non-merger transmits data in that slot.

In an embodiment, if data is received from the input interface 115, the corresponding Slot Source Flag may be set within the data packet. Such locally received data may be inserted into data packets transmitted via each non-merger port.

In an embodiment, if data is received from a first port of the non-merger, the data may only be transmitted over the second port unless certain conditions are met. For example, if the first port of the non-merger is in loop-back mode, data received from the port may be transmitted via the same port (with the Slot Source Flags unset for all slots that did not have data inserted by the non-merger). The non-merger may be in loop-back mode, for example, if the non-merger does not recognize that a second device is attached to the second port.

In an embodiment, if data received from a port has a corresponding Slot Source Flag set, the corresponding Slot Source Flag for the outgoing data on the other port may likewise be set. In the non-merger is in loop-back mode, the Slot Source Flag may be cleared prior to transmission.

In an embodiment, data received at a first port of a non-merger may be transmitted via the second port unless it is locally replaced, an updated Control Block CRC is inserted (e.g., if data is inserted into the Control Block by the non-merger), and/or the receiving port of the non-merger is in loop-back mode. The non-merger may set a Clock Master Source Flag is the non-merger is the Clock Master (as described below) or if a data packet is received from the direction of the Clock Master. In alternate embodiments, a non-merger may make alternate or additional modifications to received data packets in accordance with the implementation of the corresponding embodiment.

Mergers

Figure 2:
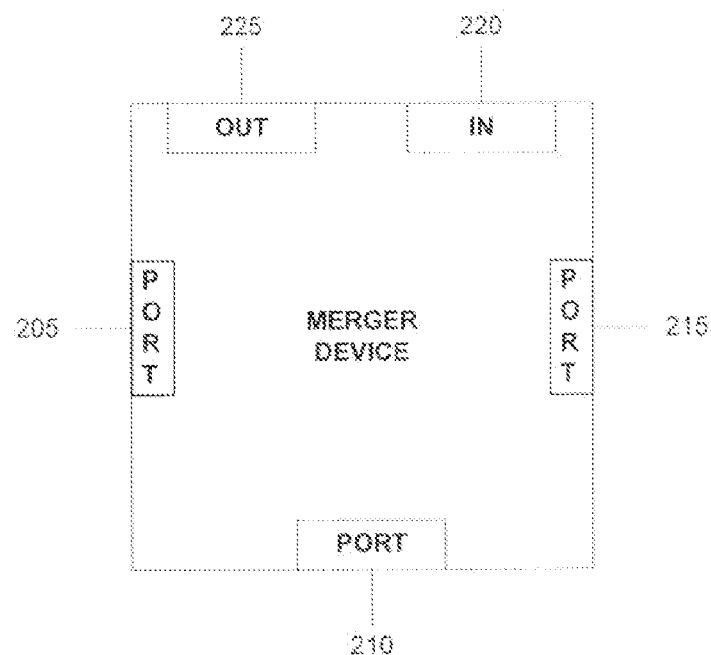
FIG. 2 depicts an exemplary merger device according to an embodiment.

In an alternate embodiment, a node in a networking system may be a merger device, such as shown in FIG. 2. A merger may have three or more ports, such as 205, 210, 215, by which it may be connected to the networking system. A merger may replace and/or add data received from an input interface 220 to an incoming packet in order to generate an outgoing data packet. Likewise, a merger may output data via an output interface 225 similar to non-merger device. In an embodiment, a merger may further combine data from a plurality of incoming data packets into an outgoing data packet for each output port. Each incoming data packet may be received from a corresponding port on the merger.

A merger may have one port designator for each port. The port designators may pertain to physical ports on the merger. The ports may be referred to herein as "Port A," "Port B," "Port C," etc. However, such designations are non-limiting. In an embodiment, a cable attached to one of the merger's ports may remotely power the merger.

In an embodiment, a merger may receive a plurality of incoming data streams. Such data steams may be synchronized. Despite being synchronized, however the data streams may have varying time offsets and jitter.

In an embodiment, Source Flags may be used to denote a source of incoming data. For example, six types of Source Flags may be used within a networking system: a Control Master Source Flag, a Salve Source Flag, a Clock Master Source Flags, Data Slot Source Flags. Serial Data Slot Source Flags and Talkback Slot Source Flags. The Control Master Source Flag and the Slave Source Flag may be sued as described below with respect to the Control Bus. The Clock Master Source Flag may be used to denote that an incoming data has been sent from the Clock Master. Packets in which the Clock Master Source Flag is set may be sued to control the timing of outbound data streams from a node. The Data Slot Source Flags, Serial Data Slot Source Flags and Talkback Slot Source Flags may be used to denote when data is active in a particular slot, serial data slot, or talkback slot, respectively. In an embodiment, on Data Slot Source Flag may be used for each data slot and one Serial Data Slot Source Flag may be used for each serial data slot. In an embodiment, one Talkback Slot Source Flag may be used for each talkback slot.

A merger may use the Source Flags to determine whether a node on a serial run connected to the merger inserted data corresponding to each flag. For example, a merger may receive data packets with non-zero data in slot 5 in multiple incoming data streams simultaneously. In an embodiment, the merger may use the data from the packet for which Data Slot Source Flag 5 is set when generating an output packet. Data associated with any set Source Flag may be inserted into a corresponding portion of the outgoing data streams. In an embodiment, no particular source Flag may be set on more than one incoming data stream of a merger, except for the Slave Source Flag.

If the merger does not receive a Source Flag for a particular packet data location, the merger may fill the location in all outgoing data streams with zeros. Since the inbound data streams are not time-aligned, each incoming packet may be buffered prior to assembling the packets into an outgoing packet. An incoming packet in which the Clock Master Source Flag is set may control the timing of all outgoing data streams.

Port inputs for a merger may receive incoming data streams, and port outputs for a merger may transmit outgoing data streams. Each data stream may be used to transmit data in a packet format. In an embodiment, mergers may have the same clock and/or (analog or digital) audio inputs and/or outputs that non-mergers have. In an embodiment, a merger may be a Clock Master. If a particular merger is a Clock Master, the Clock Master Source Flag may be set on all outgoing packets and may not be set on any incoming packets. In an embodiment, a merger may be a channel source having an analog or digital audio input/output port. If a merger is a channel source, the appropriate Source Flag may be set on all outgoing data streams. If an Source Flag is detected on a merger port's incoming data stream, the data corresponding to the Source Flag may be inserted into outgoing packets for all ports of the merger (including, for example, the port on which the data came). However, the Source Flag may be set in all outgoing packets except the port from which the data was received. This may denote that the data that was inserted has been read by all downstream ports from the originally inserting node in the serial run in the direction of the merger.

If a Control Master Source Flag is received on an incoming data stream and no Slave Source Flag is received from any other port, or if the Control Master and Slave Source Flags are both received from the same incoming data stream, the Control Block from the data packet bearing the Control Master Source Flag may be forwarded to every outgoing data stream. However, if the Control Master and Slave Source Flags are received from different incoming data streams, the Control Block for the incoming data stream including the Slave Source Flag may be forward only to the port from which the incoming data stream for which the Control Master Source Flag was set, and the Control Bock for the incoming data stream including the Control Master Source Flag may be forwarded to all other outgoing data streams.

In an embodiment, one of the incoming data streams may include the Clock Master source. Each outgoing data stream may be clocked by the packet rate of this data stream's Inbound Clock Master Source packet. The Clock Master Source Flag may be inserted on all outgoing data streams except for the port corresponding to the incoming data stream from which it was received.

In an embodiment, if a merger received a particular Source Flag on a particular port, the merger may identify that port as the source for that particular data as long as the Source Flag remains set. If a particular Source Flag appears on the incoming data stream of two or more ports simultaneously, the merger may randomly select one incoming data stream for which to forward the data. In an alternate embodiment, the merger may assign a priority to each port. In such an embodiment, the merger may select among to ports having set Source Flags by forwarding the data from the port having the highest priority.

Talkback Source Flags may function as assignable Slots. For example, a slave may request use of a Talkback Slot from the Control Master. If granted, that Slave may become, for example, the temporary slot 1 talkback source and may set the Talkback Source Flag from slot 1 accordingly.

Non-mergers may set, clear and/or block Source Flags when receiving and/or transmitting data streams from one port to the other. Generally, non-mergers may not use the actual Source Flag values for any internal determinations. In an embodiment, a non-merger may clear the data slot in a data packet if (i) the Data Slot Source Flag for that data slot is not set in the incoming data packet, (ii) the incoming data packet is received on a port that is in loop-back mode (i.e., the non-merger is the last device in a serial run), and (iii) the non-merger is not inserting data into the data slot. This may prevent stagnant data from remaining in a network if a node that was inserting data powers down.

Enumeration

In an embodiment, one or more nodes of a networking system may require port assignment and enumeration to determine the device identifier for the node. In an embodiment, each node may initially consider itself to be a slave device. A control register within, for example, one node may be written by a control processor to denote that the particular device is the Control Master. The control pressure may determine the Control Master based on, for example, a message from an application and/or by reading an input pin, a stored value, and/or a hardwired value. A device may be required to have the capability of being able to generate packets in order to be a Control Master.

Figure 3:
FIG. 3 depicts an exemplary initial state for a Control Master according to an embodiment.

FIG. 3 depicts an exemplary initial state for a Control Master according to an embodiment. As shown in FIG. 3, both ports of the Control Master may be configured to transmit outgoing data on the pre-configured output pins, such as pins 1 and 2 of a CAT-5, CAT-4, or CAT-3 cable, and receive incoming data on pre-configured input pins, such as pins 3 and 6 of a CAT-5, CAT-4 or CAT-3 cable. The Control Master may be initialized to have both transmitters and receivers enabled for its data networking ports. In an embodiment, the transmitters may send idle data packets.

Figure 4:
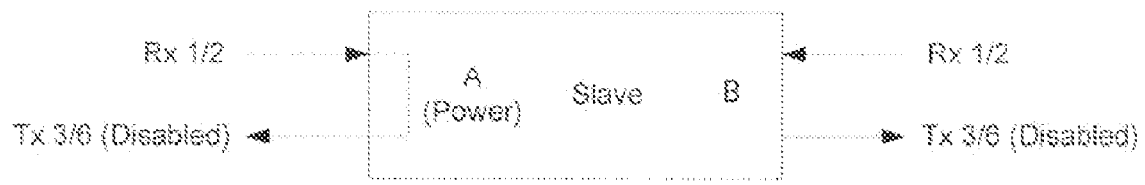
FIG. 4 depicts an exemplary initial state for a slave according to an embodiment.

FIG. 4 depicts an exemplary initial stat for a slave device according to an embodiment. As shown in FIG. 4, each slave device may make an arbitrary initial assignment of Port A and Port B. In an embodiment, PORT A may be assigned to the port that is capable of providing power to the device. The initial port assignment may change during the enumeration process. The received for each port may be enabled, for example on pins 1 and 2 of a CAT-5, CAT-4, or CAT-3 cable. The transmitter for each port may be disabled. The transmitter may be assigned, for example, to pins 3 and 6 of a CAT-5, CAT-4, or CAT-3 cable. Port A may be set to loop-back mode, as shown in FIG. 4.

In an embodiment, port assignments for slave devices may be updated. For example a slave device may configure its ports based on the first port that detects incoming idle data packets, which may be identified using link detect information. Link detect information may be any information that is included in a data packet denoting that the packet was transmitted by another device, whether directly or indirectly. The first port that receives the link detect information for the slave device may be assigned or reassigned as Port A. The newly assigned Port B (i.e., the port that is not assigned as Port A) may then swap the pins assigned to the receive and transmit ports. For example, the transmitter may be assigned to pins 1 and 2 of the cable and the receiver may be assigned to pins 3 and 6 in the embodiment described above. The transmitter on Port B may be enabled and send idle packets in a Force Link mode. The transmitter on Port A may likewise be enabled in order to allow communication between the slave device and the device connected to its Port A. Loop-back may be enabled on Port A, but not on Port B. The device may then request a logic device identifier from the Control Master.

The control processor may monitor the Port B status to determine whether link detect information is set. The link detect information may only be set if another slave device is connected to Port B. If the link detect information is set, the slave device may removed the loop-back operation on Port A and pass incoming Port A data to the transmitter on Port B. Likewise, data received on Port B may be forwarded to the transmitter on Port A.

FIGS. 5A-5D depict an exemplary port assignment and enumeration process for three devices according to an embodiment. Each transmitter then is enabled is depicted as having a narrowed line coming out of it. Each port in loop-back mode is depicted as having a dashed line connecting the receiver and the transmitter on that port. Until ports are actually assigned, the ports are labeled as P (powered) and U (unpowered).

Figure 5A:
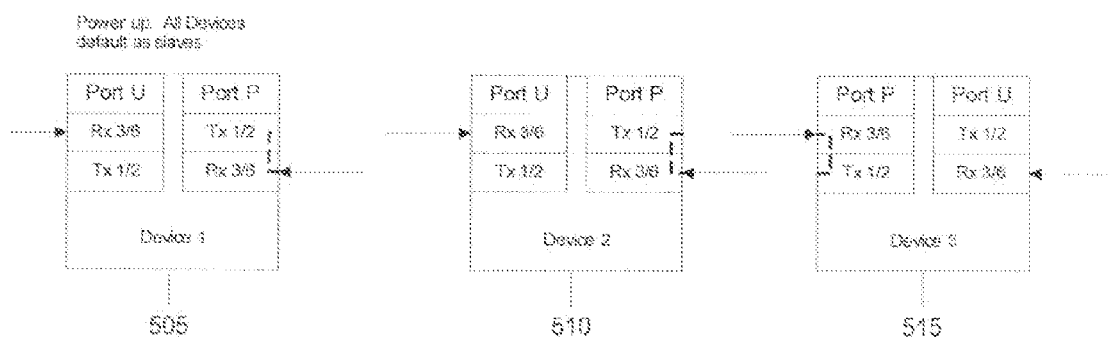
FIGS. 5A-5D depict exemplary network state diagrams during a process for initializing and enumerating devices according to an embodiment.

As shown in FIG. 5A, Device 1 505 may be configured to the Control Master, and Device 2 510 and Device 3 515 may be configured to be slave devices. Moreover, Device 2 510 may be wired such that its powered port is connected to Device 3 515 instead of Device 1 505. FIG. 5A may depict the system prior to Device 1 505 recognizing that it is a Control Master. All devices may be initialized as slaves with receivers enabled (looking for the link detect information) and receivers for the powered ports in internal loop-back mode.

Figure 5B:
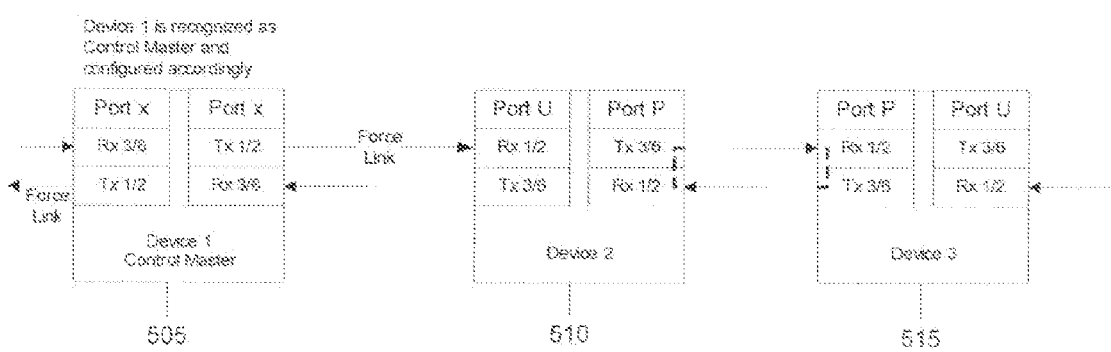

As shown in FIG. 5B, Device 1 505 may detect that it is designated to be the Control Master via, for example, an application, a user switch and/or a jumper). The device may set the transmitters for both ports to be on a known wire pair, such as pins 1 and 2, and the receivers for both ports to be on a known wire pair, such as pins 3 and 6. Device 1 505 may then disable the internal loop-back on both ports and begin transmitting packets in Force Link mode in both directions. As shown in FIG. 5B, the Control Master may wait for slave devices to sequentially start to come on line and to request enumeration. Labeling ports as Port A and Port B on the Control Master may not be required since such designation my be irrelevant on the Control Master.

Figure 5C:
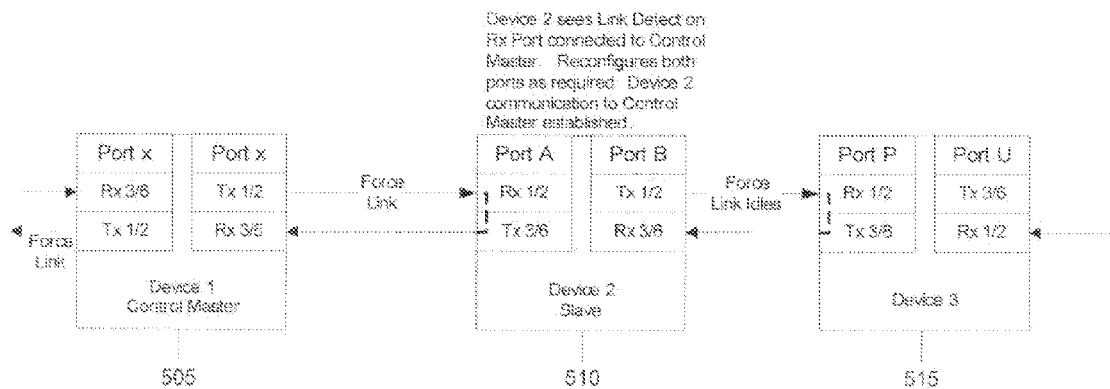

As shown in FIG. 5C, once the Control Master sends packets. Device 2 510 may see link detect information on its unpowered port (Port U in FIG. 5B). Since this data comes form the Control Master 505, Device 2 510 may reassign the Unpowered Port as Port A and the Powered Port as Port B, and configure Port B by swapping the pin assignments for its receiver and transmitter and enabling the transmitter on Port B to send idle data packets in Force Link mode. Device 2 510 may further configure Port A by enabling the transmitter and setting the port to loop-back mode. Since Port A is now in loop-back mode, the communicating loop between the Control Master 505 and Device 2 510 may be completed. Accordingly, Device 2 510 may communicate with the Control Master 505 using the Control Bus.

Figure 5D:
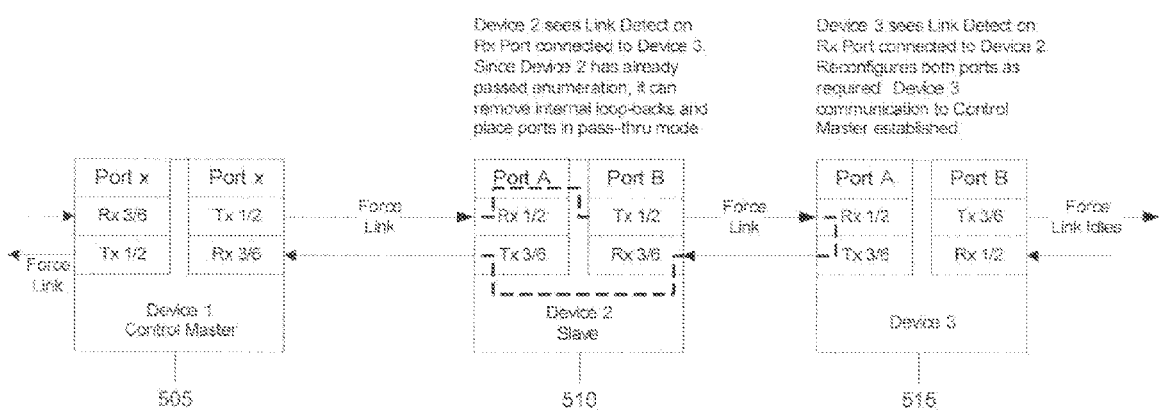

As shown in FIG. 5C, Device 2 510 may use the Control Bus to communicate with the Control Master to request enumeration and receive its logical deice identifier. Furthermore, Device 2 510 may use the Control Bus for application-specific activities such as reporting its capabilities, receiving slot assignments, etc. As soon as Device 2 510 has received its logical device identifier, it may begin to monitor the receive line of Port B to look for link detect information. When link defect information is received from Device 3 515, which occurs using the same operations described above in FIG. 5C for Device 2 510. Device 2 may remove the internal loop back on Port A and connects Ports A and B internally so that incoming data on Port A is transmitted on Port B and incoming data on Port B is transmitted on Port A. This is referred to as "pass-through" mode. FIG. 5D depicts how Device 2 510 and Device 3 515 may be configured after this process has completed. Device 3 515 may then request a logical device identifier, place Port A is loop-back, mode, etc. in a similar fashion as described above from Device 2 510.

At this point, both slave devices may be able use the Control Bus for application-specific messaging (as described below in the Control Bus Protocol section). An additional slave connected to Port B of Device 3 515 may follow the same procedures to establish communication with the Control Master. Accordingly, any number of slave devices may be sequentially enumerated. Alternate and/or additional enumeration processes will be evident to those of ordinary skill in the art based on the teachings disclosed herein.

In an embodiment, an additional slave device (not shown) that is connected to Port B of Device 3 515 while the networking system is in operation may be recognized, receive a logical device identifier, place Port A in loop-back mode, etc. As stated above, Device 3 515 may already be transmitting idle packets and looking for link detect information on its Port B. Likewise, the additional slave device may be looking for link detect information via each to its ports. When the additional slave device detects the idle data packets that are being transmitted by Device 3 515, it may configure its ports accordingly, which in turn may cause Device 3 to remove its loop-back mode and enter pass-through mode. After the additional slave device undergoes enumeration, it may become the end of the serial run.

Figure 5E:
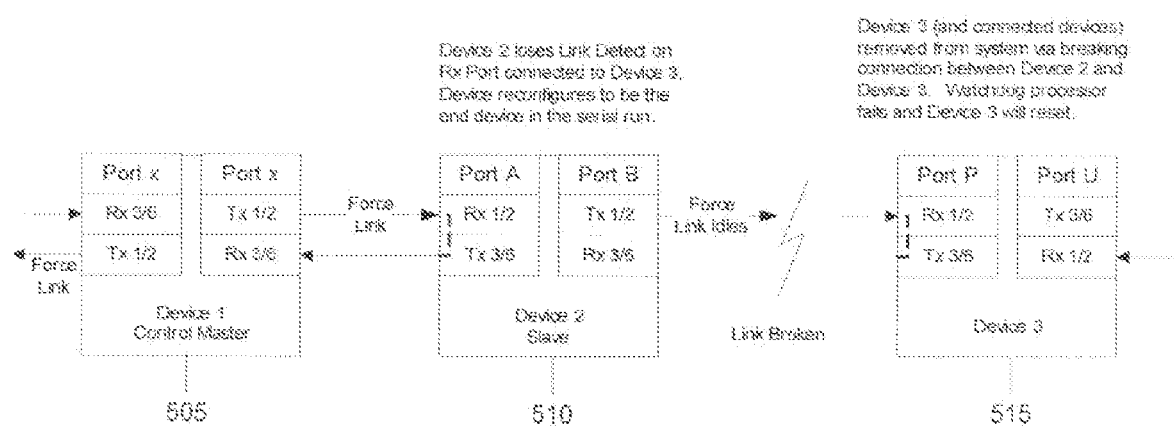
FIG. 5E depicts an exemplary network state diagram according to an embodiment.

In an embodiment, if a serial run is already established and a link is broken, communications may continue between the devices that are connected to the Control Master 505. In an embodiment, one of two scenarios may take place when a link is broken. The first scenario occurs if Device 3 515 is no a Clock Master. As shown in FIG. 5E, the control processor of each of Device 2 510 and Device 3 515 may periodically monitor each of its ports to ensure that the link detect information is still valid. When the link is broken (between Device 2 510 and Device 3 515), Device 2 may recognize that the link detect information on Port B is gone. In an embodiment, Device 2 510 may reconfigure its ports so that it reverts to the condition shown in FIG. 5E.

Likewise, Device 3 515 may determine that the link detect information is lost on the port that was connected to Device 2 510. Accordingly, Device 3 515 may determine that it is no longer connected to the Control Master 505. In an embodiment, Device 3 515 may perform a reset condition if this scenario occurs, as is also shown in FIG. 5E.

Since the Control Master 505 periodically checks all devices in the networking system, it may detect that Device 3 515 is no longer connected and remove it from the networking system. This information may be passed to any applications as well. In an alternate embodiment, Device 2 510 may report to the Control Master 505 that the link detect information on its Port B is no longer valid. Accordingly, the Control Master 505 may then know to remove Device 3 515 and all devices that were connected to it "downstream" from the networking system.

In an embodiment, if Device 3 515 is the Clock Master and it is separated from the Control Master 505, all packets in the networking system may be lost. This may result in the Control Master 505 assuming the role of Clock Master immediately. In an embodiment, the Control System may attempt to recover the data from the data packets in the system. In an alternate embodiment, the networking system may reset and reinitialize if the Clock Master is lost.

In an embodiment, if a device is a merger, the device may initially attempt to detect link detect information on all ports with its transmitters disabled. The first port on which the link detect information is detected may be assigned to be Port A and may have its transmit and receive lines swapped as described above. All other ports may be assigned to be auxiliary ports.

The Control Master may then enumerate the merger. Once the merger is enumerated, it may determine whether link detect information is present on any of the auxiliary ports. If a link detect is detected on any auxiliary port, the merger may notify the Control Master of a new device using the merger's logical device identifier and the auxiliary port assignment. The Control Master may then notify the slave at that location that it can join the networking system as described above. If Port A of the merger is in a loop-back configuration, the merger may be set to a pass-through configuration of all auxiliary ports.

The merger may then monitor all ports for their respective link detect information. If link detect information is lost on one or more ports, one for, for example, three conditions may occur. If the link detect information on Port A is lost, the merger may reset since it is disconnected from the Control Master. If link detect information is lost on at least one, but not all, auxiliary ports, the Control Master may be notified of the ports for which the link detect information has been lost. If link detect information is not present on any auxiliary port, the merger may notify the Control Master via Port A and may place Port A in a loop-back configuration.

In an alternate embodiment, a slave device is a serial run enumeration may power up monitoring each of its ports with transmitters disabled. The first port that observes link detect information may be assigned as the Main port and may be placed in a loop-back configuration with its transmitter enabled. The other port may be assigned as the Aux port, may swap its output pin setting, and may enable its transmitter. The slave device may then be enumerated via the Control Master. Once it is enumerated, the slave device may monitor its Aux port for link detect information. If link detect information is detected on the Aux port, the slave device may notify the Control Master of a new device based on the slave device's device identifier (assigned during enumeration) and merger port assignment. The Control Master may then direct the slave to allow the pending device to join the networking system. The slave may remove the loop-back configuration on its Main port and allow data to pass from the Main receive port to the Aux transmit port and from the Aux receive port to the Main transmit port. Both ports may then be monitored for link detect information to observe port activity. If link detect information becomes undetected on the Aux port, the Main port may be placed in a loop-back configuration, and the slave device may notify the Control Master. The slave device may then attempt to re-detect the link detect information. If the link detect information becomes undetected on the Main port, the slave device may reset.

In an embodiment, a merger that is a slave device may power up monitoring all of its ports with its transmitters disabled. The first port on which link detect information is observed may be assigned as the Main port and may be placed in a loop-back configuration with its transmitter enabled. Each other port may be assigned as an Aux port, may swap its output pin setting, and may enable its transmitter. The merger may then be enumerated via the Control Master. Once the merger is enumerated, it may monitor each Aux port for link detect information. If link detect information is observed on any Aux port, the merger may inform the Control Master of a pending device using the merger's device identifier (provided during the enumeration process) and merger port assignment. The Control Master may then direct the merger to allow the pending device to join the networking system. If the Main port of the merger is in the loop-back configuration, the condition may be removed. Accordingly, data may be permitted to flow from the Main receive port to all of the Aux receive ports and from all of the Aux receive ports to the Main transmit port. All ports may then be monitored for link detect information to observe port activity. If link detect information becomes undetected on an Aux port but link detect information is still detected on other Aux ports, the merger may notify the Control Master. If the link detect information becomes undetected on all Aux ports, the Main port may be placed in a loop-back configuration, and the merger may notify the Control Master. In either of these cases, the merger may continue to attempt to detect link detect information from the Aux ports. If the link detect information becomes undetected on the Main port, the merger may reset.

Data Bus Protocol

Figure 6:
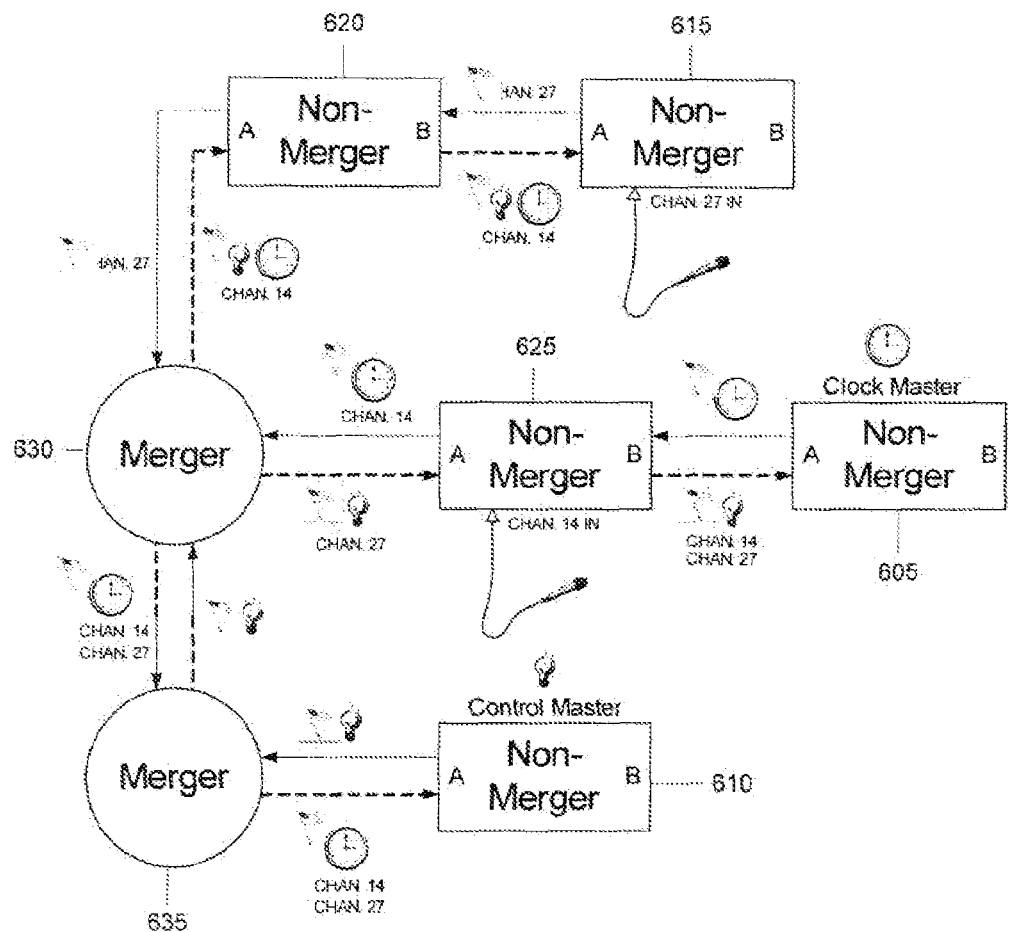
FIG. 6 depicts an exemplary dataflow for Source Flags according to an embodiment.

FIG. 6 depicts an exemplary dataflow for Source Flags according to an embodiment. As shown in FIG. 6, the networking system may include a Clock Master 605 and a Control Master 610. The Clock Master 605 may be used as a means to synchronize data packets between the nodes in the networking system. This may be accomplished, for example, by taking delay measurements in the Clock Master 605, any non-merger devices using digital I/O and any merger devices in the path between the Clock Master and a non-merger device that is being calibrated. The information may be collected at the non-merger device as a background process. Upon completing an initial set of calculations, the non-merger device may adjust its local clock generators to bring itself into alignment. The merger device may continue to align itself over time using a statistical averaging process. The Control Master 610 may perform the operations described below with respect to the Control Bus. In an embodiment, the Control Master 605 and the Clock Master 610 may be the same device.

Other nodes may also be present in the networking system, such as non-merger devices (615, 620 and 625) and merger devices (630, 635). As shown in FIG. 6, non-merger 615 may receive audio data assigned to slot 27, and non-merger 625 may receive audio data assigned to slot 14. Data packets flowing away from an input source may set the Data Slot Source Flag corresponding to the slot on which the data is transmitted. In addition, the Control Master Source Flag and/ or the Clock Master Source Flag may be set on data packets flowing away from the Control Master 610 and Clock Master 605, respectively. In an embodiment, the Control Master Source Flag may be set in accordance with the Control Bus protocol described below.

Referring back to FIG. 6, a non-merger 615 may receive data on a channel 27 (with Data Slot Source Flag (DSSF) 27 set) and transmit the data out port A to non-merger 620 in slot 27 of its data packet. Non-merger 620 may receive on Port B and re-transmit on Port A the slot 27 data with DSSF 27 set. Merger 630 may receive the slot 27 data on the port connected to non-merger 620 and re-transmit the data to its other ports (i.e., the ports connected to non-merger 625 and merger 635) with DSSF 27 set. The data may continue to propagate through the networking system until it reaches non-mergers 605 and 610). At this point, the data may not be forwarded to nodes which have not previously received the data since the non-receiving port of each node 605 and 610 is not connected to another node. In other words, non-mergers 605 and 610 each have Port A in loop-back node. Accordingly, the data in slot 27 may be re-transmitted out Port A of the non-mergers 605 and 610 with DSSF 27 cleared. Since DSSF 27 is cleared, nodes receiving the data may recognize that the data has previously been received and is stale. Similar operations are performed for each of channel 14 data, control master data, and clock master data.

Control Bus Protocol

Figure 7A:
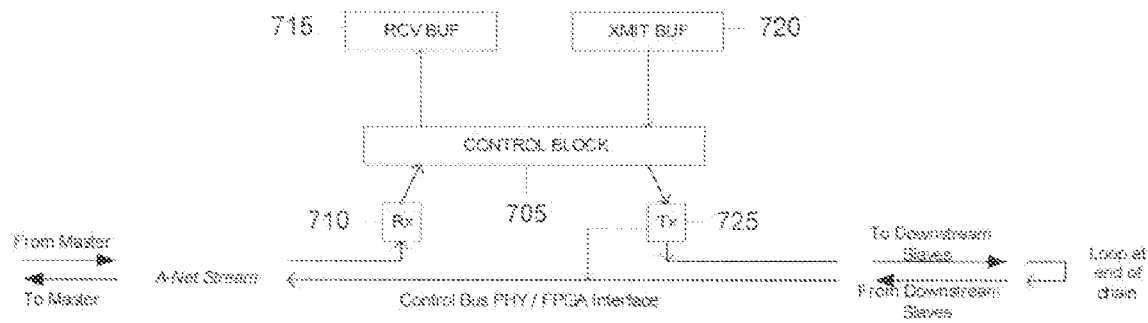
FIG. 7A depicts exemplary control bus components within a device according to an embodiment.

FIG. 7A depicts exemplary control bus components within a device according to an embodiment. A Control Block 705 may be a portion of a data packet dedicated for transmitting control information. Each device in a networking system may receive a packet through a physical interface 710 and read data from the Control Block 705 into one or more receive buffers 715. Likewise, a device may transit data to the Control Bolck 705 by storing the information in a transmit buffer 720, write the data from the transmit buffer to the Control Block, and transmit the packet to a physical interface 725. In an embodiment, the transmit physical interface 725 may be connected to all ports of a device and the receive physical interface 710 may be connected to a single port of the device. A processing device (not shown) may read information from the receive buffer 715 and write information to the transmit buffer 720.

In an embodiment, the Control Block 705 may not change with every data packet. Accordingly, it may not be required to make each Control Block 705 available to the processing device. However, data read by the processing device should only be from one packet, and should not be a combination of data segments from two separate packets. As such, the transfer of incoming control data from the receive physical interface 710 to the receive buffer 715 may only occur when requested by the processing device. Thus, the processing device may only read Control Block 705 information that is specific to one data packet. Once the processing device reads this information, it may make decisions based on this data and write results (if any) to the transmit buffer 720. The processing device may then write the data in the transmit buffer 720 into the Control Block 705 of the next outgoing data packet.

If only two devices are connected to the control bus, this scheme of transferring data from one device to another may be straightforward. However, race conditions may occur when multiple devices are connected to the control bus since the processing device may be slow as compared to the physical interfaces 710 and 725. This may result because the processing device may be required to (1) request that information in the receive buffer 715 be updated, (2) read the contents of the updated receive buffer, (3) process the data and make determinations on an appropriate response, (4) write the results to the transmit buffer 720, and (5) direct the transmit buffer to insert its contents into the Control Block 705 of the next data packet. A race condition may occur if another device has overwritten the information in the Control Block 705 during the performance of these steps.

Figure 7B:
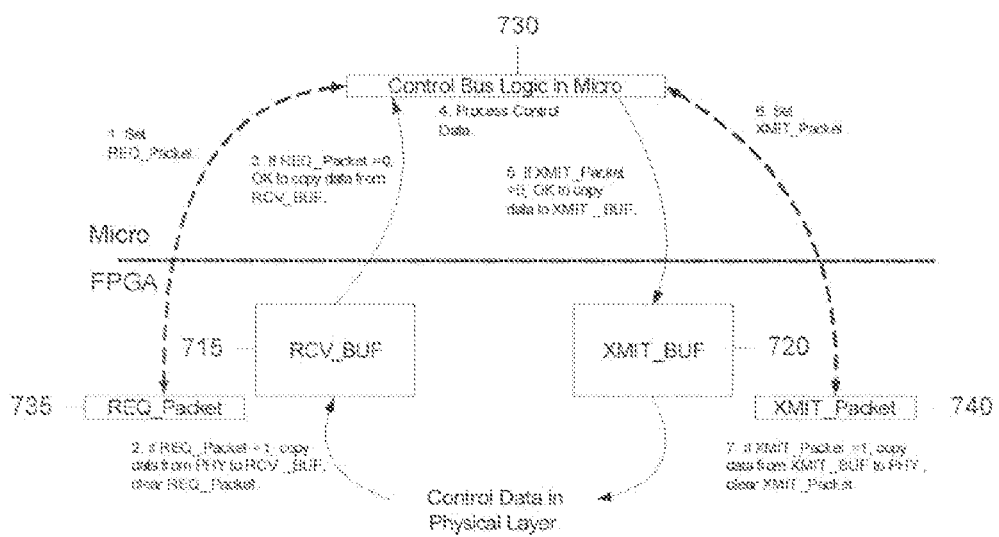
FIG. 7B depicts alternate exemplary control bus components within a device according to an embodiment.

Accordingly, a set of access flags may permit the processing device to use these buffers without risk of contention. As shown in FIG. 7B, when the processing device 730 is ready to read information from the Control Block, it may set a Request Packet flag 735. When the Request Packet flag 735 is set, the latest valid received Control Block may be transferred to the receive buffer 715. This Control Block transfer may be required to come from one packet. The Request Packet Flag may then be cleared to inform the processing device 730 that the receive buffer 715 may be read. Once data is stored in the receive buffer 715, it may not be overwritten until the processing device requests that it be updated by setting the Request Packet flag again.

Note that a CRC calculation may be performed on the incoming Control Blocks. Control Blocks having bad CRCs may not be stored in the receive buffer 715.

When the processing device 730 wants to write information into the Control Block 705 of a data packet, it may copy the information to the transmit buffer 720 and set the Transmit Packet flag 740. When the Transmit Packet flag is set, a CRC calculation may be performed on the Control Block 705. Data may then be inserted from the transmit buffer 720 into the Control Block 705 of the next outgoing data packet on both ports at the physical interface layer. The Transmit Packet flag 740 may be cleared to inform the processing device 730 that the data in the transmit buffer 720 has been stored and is being sent out.

The processing device 730 may not write data into the transmit buffer 720 while data is being placed in the Control Block. In an embodiment, this may be accomplished by double buffering the transmit buffer 720. In an alternate embodiment, a control bit may permit the processing device 730 to disable insertion of the transmit buffer 720 to the physical interface layer. Accordingly, Control Block data transferred between the physical interface layer and the processing device 730 may be bounded within a single data packet. In an embodiment, Control Block data may not be updated such that one packet receives a partial update of the transmit buffer 720 and the next packet receives the rest.

The Control Block may be divided into three separate sections: (1) Master Control Register and ID; (2) Slave Control Register and ID; and (3) Master/Slave Data. In an embodiment, the processing device 730 may only write one of the Control Block register sections and may read the other. The register to which the processing device writes may depend upon whether the device is a Master or a Slave. The Master/Slave Data section may be either read or written, depending on the data session. Further description regarding the Control Block is included below.

Because the interfaces between (1) the physical interface and the buffers and (2) the buffers and the processing device are asynchronous in nature, and many different devices can write to the Control Block, data contention may occur between devices within a networking system. Control Bus logic may be used as a communication protocol for control data in the network that prevents data contention.

The Control Bus may be a "virtual" data bus that exists within a data packet stream. The networking system may use the Control Block as a global data pool that can be physically read or written by anyone at anytime, subject to a scheme of semaphores and mutual-exclusion lockouts. This may provide a method of safe, restricted access to the data pool.

The Control Bus scheme may require one device to act as a Control Master. The Control Master may allocate the Control Bus to slave devices. In an embodiment, only one slave may have control of the bus at a time. Each slave may request access to the bus, but only the Control Master may grant access. At any time, only one Control Master and one slave may transfer Control Block data. Accordingly, the Control Bus may operate as a point-to-point path. The establishment of a point-to-point path relies on various flags and IDs within the Control Block. Either device may read the flags and IDs; however, some information may only be written by the Control Master, and some may only be written by the slave.

Any communication of application data between Control Master and slave may be termed a "session." A session may include a series of flag setting/checking/clearing using a specific protocol. This protocol may ensure that data is properly received and is not overwritten. If neither the slave nor the Control Master needs to transmit data, the Control Bus is considered idle and an idle flag may be set in the Control Block.

A basic session flow may include opening a session, transferring data between a master and a slave, and closing the session. The exact protocol followed for each step may differ for the Control Master and the slave. For either device, the device may request the bus, if the bus is available. The bus may then be granted to a specific slave device that wants to send data to the Control Master or to which the Control Master wants to send data. Once the bus is granted, the Master/Slave data transfer may be performed. Data may be transferred in packets with master and slave acknowledgments controlling the flow. At the conclusion of this data transfer, the session may be closed (i.e., the bus grant may be removed, and the bus may become available for another session to be initiated).

In an embodiment, the master/slave data transfer may be either from Control Master-to-slave or from slave-to-Control Master, but not slave-to-slave. Communication between two slaves may be performed via a first session from slave-to-Control Master and a second session from Control Master-to slave to ensure that data contention does not take place.

In an embodiment, the Control Bus may not support direct full-duplex (simultaneous bi-directional) transfer of master/slave data. Moreover, with the exception of the control register flags and device IDs, data communication may be unidirectional during a session —specifically, Control Master-to-slave or slave-to-Control Master. Since many applications transfer data in a "call response" fashion in which a device may not reply to the sender until it has analyzed the sender's incoming data, full-duplex communications may be not required. For such applications, it may be undesirable to have the Control Bus unavailable while the processing device is processing the information since other sessions may be performed instead. As such, having multiple sessions may free the Control Bus and keep application-specific processing delays independent of Control Bus throughput. In addition, having a unidirectional Control Bus session may permit the system to streamline processes, such as uploads or downloads of large amounts of information. The sending device may fill application packets while its application output queue has data. The only response required from the receiver may be an acknowledgement that the last master/slave data packet was received and delivered to the application.

The entire Control Block for a data packet may be checksummed with a 16-bit CRC, which is independent of any other packet CRC. The CRC may permit devices to ignore control data that is corrupted during transmission.

The Master Control Register may include, without limitation, a set of control flags and a Master Device ID field. The flags and Device ID may be written only by the Control Master and may be broadcast to all slaves in the network, which reads the fields. In an embodiment, the flags may compromise one bit entries within a single byte. The following table details exemplary control flags for the Master Control Register according to an embodiment:

| Flag | Name | Description |
| --- | --- | --- |
| BAVL | Bus Available | When set, indicates Control Bus is available for device requests. Flag is cleared when a valid bus request is recognized and is being processed, when the Control Bus is allocated to a slave, or if the Control Bus is in the process of being released. |
| BGRNT | Bus Grant | Flag is set whenever a session has been opened and a communication path has been established between the Control Master and a slave. |
| BCST | Broadcast | Flag is set when the Control Master broadcasts data to all devices in the system. This may include application data or specific Control Bus commands. |
| MREQ | Master Request | Flag is set when the Control Master initiates a session. Flag is cleared when all data has been transmitted and session is being closed. |
| MACK | Master Acknowledge | Flag is set to notify the slave that the Control Master received and processed the last control packet or that the Control Master is sending new data. This flag permits flow-control. |
| BCST_NEW | Broadcast New Data | Flag toggles during a broadcast session requiring multiple packets when the Control Master has loaded new data to be read by all receiving devices. |
| MRMT | Master Remote Data | The Control Master sets this flag to notify the receiving slave that the slave's processing device should not process the data packet directly. Instead, some or all of the packet contents are directed for remote processing (i.e., by a third party application, etc.). |

The Master Device ID may include, for example, two bytes and may permit the Control Master to identify the slave device to which the Control Bus is granted. As such, the Master Device ID may change from session to session.

The Slave Control Register may include, without limitation, a set of control flags and a Slave Device ID field. The flags and Device ID may be written only the slave devices and may be read by the Control Master. In an embodiment, the flags may comprise one bit entries within a single byte. The following table details exemplary control flags for the Slave Control Register according to an embodiment:

The Master/Slave Data section may include data that is largely transparent to the Control Bus logic. The data may be received from the physical interface layer and passed to an application or from an application and passed to the physical interface layer.

A Device ID may be used to identify a specific slave with which the Control Master is communicating during a session. To ensure that both the Control Master and slave are in agreement, two Device ID registers may be used: (1) the Slave Device ID, which identifies a slave writing to the Control Bus, and (2) the Master Slave ID, which identifies a slave to which

| Flag | Name | Description |
| --- | --- | --- |
| SREQ | Slave Request | Flag is set when a slave initiates a session. Flag is cleared when all data has been transmitted and session is being closed. |
| SACK | Slave Acknowledge | Flag is set to notify the Control Master that the slave received and processed the last control packet or that the slave is sending new data. This flag permits flow-control. |
| SRMT | Slave Remote Data | The slave sets this flag to notify the Control Master that the Control Master's processing device should not process the data packet directly. Instead, some or all of the packet contents are directed for remote processing (i.e., by a third party application, etc.). |
| SSA | Slave Session Active | Flag is set to indicate that a Slave is currently involved in a session. For every packet, the Control Master sets this flag to zero on its outgoing transmissions. The active slave in turn asserts this flag to indicate to the Control Master that the slave is present. When a session terminates, the slave stops asserting this flag to notify the Control Master that the bus is idle. |

The Slave Device ID may include, for example, two bytes and may identify the slave device that is writing the Slave Control Register section of the Control Block. From the Control Master's point of view, the Slave Device ID may vary from session to session.

the Control Master has granted access to the Control Bus for a session. The term "Device ID" may apply to both the Master Device ID and Slave Device ID, unless otherwise specified.

The Control Master may write the Master Device ID where initiating a session or granting the bus to a requesting slave.

The Slave may write the Slave Device ID when initiating a session or responding to a request from the Control Master. When a particular Slave is active, it may always write the same ID to the Slave Device ID field.

In an embodiment, the Device ID fields may each include, for example, two bytes. A device ID of 0xFFFF may be reserved for devices that have not been enumerated. The enumeration process (described above) may ensure that devices are initialized sequentially. A new device, when added to the system, may alert that Control Master that is on the bus with a Device ID of 0xFFFF. This Device ID may inform the Control Master that the device requires enumeration. The Control Master may then assign a unique Device ID to the device. At that point, the device may upload its capabilities to the application task on the Control Master. The Control Master may track the number of unique devices in the system and the IDs which have been assigned.

When a broadcast occurs from the Control Master, the Control Master may set the Broadcast flag in the Master Control Register. When the Broadcast Flag is set, each slave may disregard the Master Device ID. In an embodiment, the Control Master may wait a nominal amount of time to ensure that all devices received the Broadcast flag. If the Control Master has data to broadcast, it may load the new data and toggle the Broadcast New Data flag. When the Control Master has no more data to send, it may release the Control Bus.

In an embodiment, broadcasting to a plurality of slaves may be supported using a layer of application code handled by the Control Master or the grouped slaves. As such, the sub-group logic may be efficiently placed for a particular application. Factors to be considered when determining where to place the handling code may include the number of devices in the system, the number of devices in a sub-group and the number of sub-groups.

If supported by the Control Master, the application logic at the Control Master may repeat the application message for each device in the sub-group. This may be most efficient where many sub-groups exist with a small number of devices in each sub-group.

If supported by slaves, the application logic at the Control Master may broadcast the sub-group data to all devices. In this case, the slaves may then determine whether to act based on sub-fields in the application data. This may be most efficient for systems where most, but not all, devices are included in a sub-group.

If all devices in a system are in a serial run, communication between these devices may be straightforward. When a system contains Mergers, the Merger may be required to route incoming data streams to the proper outgoing data streams on the various ports. These routing instructions may be conveyed via Source Flags within the data packet. For example, two source flags specific to routing various sections of the Control Block may include a Master Control Register Source (MCRS) flag and a Slave Control Register Source (SCRS) flag. The Control Master may set the MCRS flag at power up to denote the origin of the Control Master. The MCRS flag may not be cleared during normal operation. A slave sharing the Control Bus with the Control Master for a session may set the SCRS flag. This slave may set the flag when the slave requests the bus of the slave acknowledges a bus request from the Control Master. This flag may be cleared when the slave determines its session is complete. The MCRS and SCRS flags may determine whether data is inserted into the outgoing Control Block sections of the packets on the physical interface. When the bus is Idle, many slaves may assert the SCRS flag to request use of the Control Bus. Each slave that is not granted the bus may be required to de-assert its copy of the SCRS flag.

A control bit within each device may be used to direct whether the device is to transmit data or pass data through. In order to utilize the Master/Slave Data, a session may be established and engaged. As such, the control bit may be set when the bus is obtained during a session, but before notifying the session-partnered device that new data is available. Similarly, this bit may be cleared prior to or as a part of session termination.

A slave may not consistently write a zero to the SCRS Flag. Otherwise, the SCRS Flag may never be recognized for devices connected to the Control Master through the slave since the flag would always be overwritten on the inbound data path. In an embodiment, the following procedure may be used to set MCRS and SCRS flags.

A local copy of the MCRS and SCRS flags may be kept in each device. These flags may enable a device to write particular Control Block sections to the physical interface layer. These flags may also be transferred to the Source Flag Block of a packet under the following condition: the MCRS and SCRS flags may result from logically ORing and the device's local copy of each flag with the incoming data of the corresponding flag.

If the Control Master or the slave does not need to transfer data, the Bus Available flag may be set to render the bus idle. In this case, the Device IDs may be unused. All other flags in the Master Control Register and Slave Control Register may include zeroes.

When the Control Bus is available, all devices may be in a IDLE state. In this state, the Control Master may determine whether data from the Control Master should be sent to a specific slave device or whether a slave is requesting the bus. If either condition is met, the Control Master may proceed to send or receive data via the Control Bus. In an embodiment, the Control Master may routinely perform a Health Check of the slaves to ensure that each slave is still functioning and listening to the Control Bus.

Likewise, each slave may determine whether the Control Master is requesting to communicate with the slave or whether data from the Slave should be sent to the Control Master. If either condition is met, the slave may proceed to send or receive data via the Control Bus.

In an embodiment, the Control Master may include a state machine that defines the operation of the Control Master on the Control Bus. Various exemplary states are described in the following table:

| Master State | Description |
| --- | --- |
| IDLE | The Control Bus is available. The Control Master waits for its processing device to queue data for a slave or for a slave to request the Control Bus. |

-continued

| Master State | Description |
| --- | --- |
| WAIT FOR BUS | The Control Master has requested the Control Bus to initiate a session with a specific slave and waits for the slave to respond. |
| WAIT FOR DATA | A specific slave has requested the bus to send data to the Control Master. The Control Master has acknowledged and granted the bus to the slave and waits for either the next data packet from the slave or the Bus Request flag to be removed. |
| PROCESS RECEIVED DATA | The Control Master notifies its processing device that data has been received and may be processed. The Control Master then notifies the slave that additional data may be sent. |
| SEND DATA | The Control Master has requested the bus, and the specific slave has acknowledged the request. The Control Master has placed new data in the Master/Slave Data block and has notified the slave. The Control Master waits for the slave to acknowledge receipt of the data. |
| PROCESS TRANSMIT DATA | The Control Master either (1) populates the Master/Slave Data block and notifies the slave or (2) initiates the termination of the session. |
| WAIT FOR RELEASE | The Control Master has removed the Bus Grant flag for a specific slave and awaits the response from the slave to close the session and release the Control Bus. |
| BROADCAST HOLD | The Control Master has placed broadcast data on the Control Bus and waits for a predetermined time for the data to circulate. |
| PROCESS COMMON ERROR | The Control Master has determined that a Control Bus communication error has occurred and processes the error. |

Likewise, in an embodiment, each slave may include a state machine that defines the operation of the slave on the Control Bus. Various exemplary states are described in the following table:

| Master State | Description |
| --- | --- |
| IDLE | The Control Bus is available. The slave waits for its processing device to queue data for the Control Master or for the Control Master to request the Control Bus for a transaction with the slave. |
| WAIT FOR BUS | The slave has requested the Control Bus to initiate a session with the Control Master and is waiting for the Control Master to grant the Control Bus to the slave. |
| WAIT FOR DATA | The slave has acknowledged the Control Master's request to transmit data to the slave and waits for the next data packet or a request to end the session. |
| PROCESS RECEIVED DATA | The slave notifies its processing device that data has been received and may be processed. For a non-broadcast session, the slave then notifies the Control Master that additional data may be sent. For a broadcast session, the slave waits for additional data. |
| SEND DATA | The slave has been granted the bus, has placed new data in the Master/Slave Data block and has notified the Control Master. The slave waits for the Control Master to acknowledge receipt of the data. |
| PROCESS TRANSMIT DATA | The slave either (1) populates the Master/Slave data area and notifies the Control Master or (2) initiates the termination of the session. |
| WAIT FOR RELEASE | The slave has removed its Bus Request flag and awaits a response from the Control Master to terminate the session. |
| WAIT FOR BROADCAST | The slave has processed broadcast data from the Control Master and is awaiting additional broadcast data or termination of the session. |
| PROCESS COMMON ERROR | The slave has determined that a Control Bus communication error has occurred and returns to the IDLE state. |

Additional or alternate states may be performed and will be apparent to one of ordinary skill in the art based on the disclosure contained herein.

Figure 8:
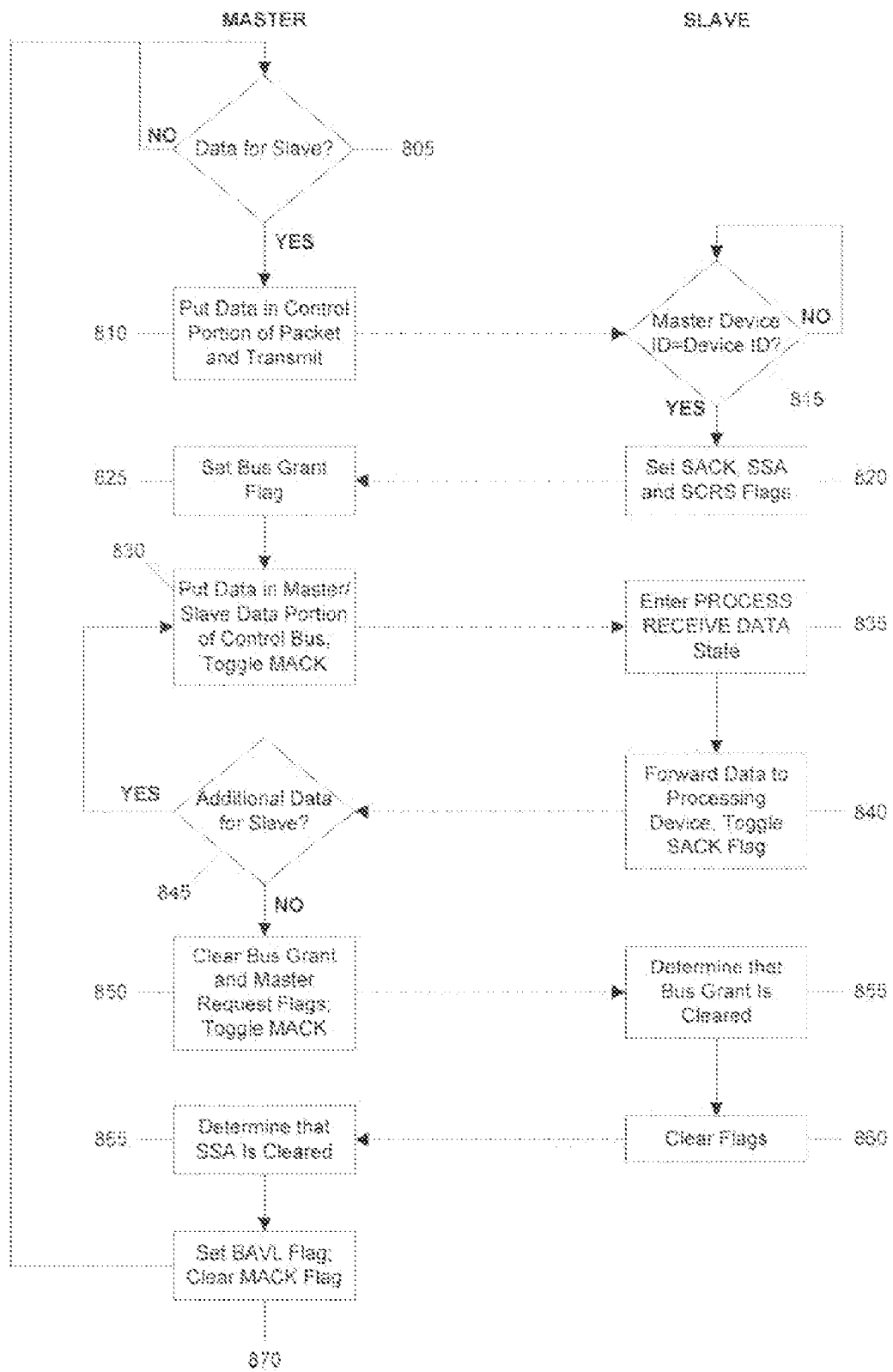
FIG. 8 depicts an exemplary sequence of events for a Master-to-Slave data transfer according to an embodiment.

FIG. 8 depicts an exemplary sequence of events for a Master-to-Slave data transfer according to an embodiment. As shown in FIG. 8, the Control Master may be in the IDLE state with the BAVL flag set and all other flags clear. The Control Master may determine 805 that its processing device needs to send data to a slave. The Control Master may clear the BAVL flag to prevent slaves from requesting the Control Bus, set the MREQ flag to request the bus, and load the Master Device ID location with the logical Device ID for the desired salve. The packet including this information may be transmitted 810, and the Control Master may then enter the WAIT FOR BUS state.

The desired slave may receive the packet while in its IDLE state, may notice that BAVL is set, and may compare 815 the Master Device ID value with its logical Device ID. If the slave determines a match, the SACK, SSA and SCRS flags may each be set 820 and returned to the Control Master. The Slave may then enter the WAIT FOR DATA state.

The Control Master may notice that SACK is set and may set 825 Bus Grant in response. The Control Master may then enter the PROCESS TRANSMIT DATA state. In this state, the Control Master may write 830 data to the Master/Slave Data section, assert the Master/Slave Data Insertion Control Bit and toggle MACK before entering the SEND DATA state.

The slave may determine 835 that MACK has toggled to indicate new data, and may enter the PROCESS RECEIVE DATA state. In this state, the slave may transfer 840 the data from the Master/Slave Data section and forward the data to its processing device. The slave may then toggle its SACK flag and return to the WAIT FOR DATA state.

When the Control Master sees the SACK flag toggle, it may return to the PROCESS TRANSMIT DATA state, determine 845 whether additional data is to be transmitted and, if so, repeat the above steps. If not data remains, the Control Master may clear its Master/Salve Data Insertion Control bit, clear BGRNT, toggle MACK, and clear MREQ. The packet may then be sent 850 to the slave and the Control Master may enter the WAIT FOR RELEASE state.

The slave may determined 855 that BRGNT and MREQ have been cleared and recognize that the Control Master has completed sending its data. The slave may then clear 860 the SSA, SCRS, SACK and SREQ flags before returning to the IDLE state.

The Control Master may determine 865 that the SSA bit is clear, and return to the IDLE state. As part of the transition to the IDLE state, the Control Master may clear 870 the MACK flags and set the BAVL flag.

Figure 9:
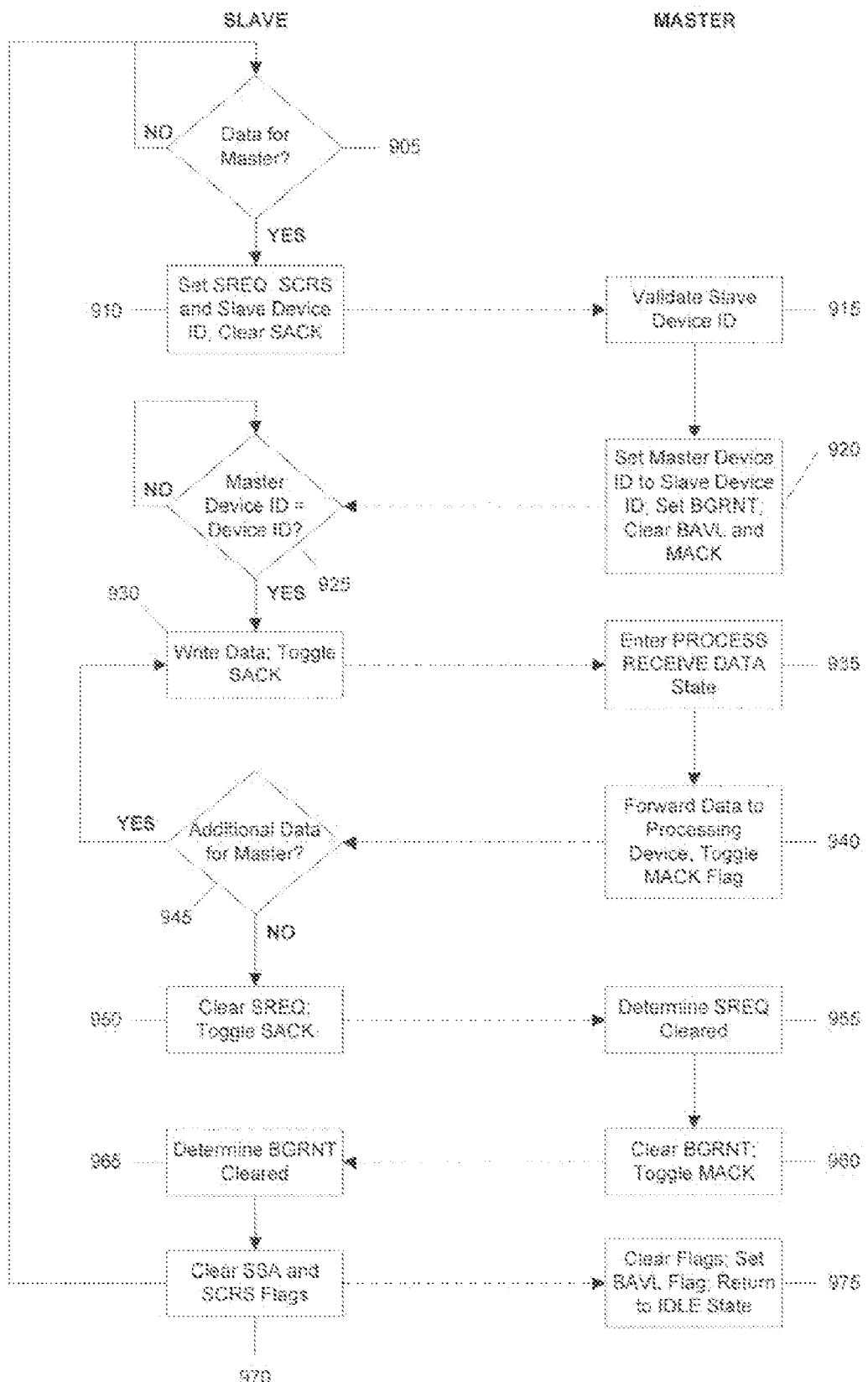
FIG. 9 depicts an exemplary sequence of events for a Slave-to-Master data transfer according to an embodiment.

FIG. 9 depicts an exemplary sequence of events for a Slave-to-Master data transfer according to an embodiment. As shown in FIG. 9, the slave may be in the IDLE state with the bus available. The slave may determine 905 that its processing device needs to send data to the Control Master. The salve may set the SREQ flag and the SCRS flag, clear the SACK flag, and set the Slave Device ID location to its logical Device ID. The packet including this information may be transmitted 910, and the slave may then enter its WAIT FOR BUS state.

The Control Master may receive the packet while in its IDLE state, may notice that SREQ is set, and may validate 915 the Slave Device ID. The Control Master may then set 920 the Master Device ID to the Device ID of the slave, clear the BAVL and MACK flags and set BRGNT in the outgoing data packet. The Control Master may then enter the WAIT FOR DATA state.

The slave may determine 925 that BGRNT is set and that the Master Device ID matches its logical Device ID. The slave may then enter the PROCESS TRANSMIT DATA state. In this state, the slave may write 930 data to the Master/Slave Data section, assert the Master/Slave Data Insertion Control Bit and toggle SACK before entering the SEND DATA state.

The Control Master may determine 935 that SACK has toggled to indicate new data, and may enter the PROCESS RECEIVE DATA state. In this state, the Control Master may transfer 940 data from the Master/Slave Data section and forward the data to its processing device. The Control Master may then toggle its MACK flag and return to the WAIT FOR DATA state.

When the slave sees the MACK flag toggle, it may return to the PROCESS TRANSMIT DATA state, determine 945 whether additional data is to be transmitted and, if so, repeat the above steps. If no data remains, the slave may clear its Master/Slave Data Insertion Control bit, clear SREQ and toggle SACK. The packet may then be sent 950 to the Control Master, and the slave may enter the WAIT FOR RELEASE state.

The Control Master may determine 955 that SREQ has been cleared and recognize that the slave has completed sending its data. The Control Master may then clear 960 the BGRNT flag and toggle the MACK flag.

The slave may determine 965 that BGRNT is clear, and return to the IDLE state. As part of the transition to the IDLE state, the slave may clear 970 the SSA and SCRS flags.

The Control Master may determine 975 that the SSA bit is clear and return to the IDLE state. All flags in the Master Control Register, except for the BAVL flag, may be cleared as part of the transition to the IDLE state.

In an embodiment, the Control Block section may provide error handling approaches that are transparent to the application layer. Control block data may include memory preset dumps, firmware downloads, volume control commands, etc. Such data may be required to arrive at its destination intact. A scheme of error detection and recovery may exist for Control Block data. In an embodiment, Control Block data may be continually retransmitted until it is successfully received.

A plurality of error types may occur during transmission of control data on the Control Bus. Exemplary error types may include invalid CRC computation, bus connection, and Device ID mismatching.

The Control Block may include a 16-bit CRC dedicated to the Control Block data (i.e., Master Control Register and ID; Salve Control Register and ID; and Master/Slave Data sections). A flipped bit due to noise on the system or an intermittent short may typically result in a CRC error. When a processing device modifies Control Block data, a CRC may be calculated. When reading a Control Block, a processing device may require a complete Control Block with a valid Control Block CRC.

In an embodiment, the CRC may be validated for each Control Block that arrives at a device. Each CRC may be checked, and, if valid, the data may be buffered. When the processing device requests a Control Block packet, via the Request Packet flag, the data may be transferred from the buffer to the receive buffer.

In an alternate embodiment, the CRC may be validated only when requested by the processing device. Thus, when the processing device requests a next Control Block packet, the incoming Control Block may be transferred to the receive buffer. The CRC may be calculated as the data is being transferred or after it is completely received at the receive buffer and may be compared with the received CRC. If the CRCs match, the Request Packet flag may be cleared and the processing device may retrieve the data from the receive buffer. Otherwise, the Request Packet flag may not be cleared. Control Blocks may be processed until a valid CRC is detected.

In another alternate embodiment, the processing device may validate the CRC itself. The processing device may transfer the Control Block data from the receive buffer to CRC validation logic. If the CRCs match, the data may be processed. Otherwise, the processing device must discard the data and requests a packet again by setting the Request Packet flag.

A second error type may be bus contention. Bus contention may occur, for example, when multiple slaves request the Control Bus at substantially the same time. A Control Master may request to send data to a slave while that slave (or a different slave) request to send data to the Control Master. Because of the asnychornous nature of Control Block data being placed on the Control bus, a Control Block may contain information written by multiple devices, where each device is unaware that the other device(s) are also writing data. In almost all cases, the receiving device may detect and handle bus contention errors. Since all communications pass through the Control Master, it may be in charge of granting the Control Bus to a specific device. Accordingly, the Control Master may determine the parameters of the session taking place and the slave that is involved.

An error involving bus contention from multiple devices may result in a Device ID Mismatch error. If the Control Master detects that the received Slave Device ID does not match the Master Device ID, the received Control Block information may be ignored, and the Control Master may continue to output its current Control Block packet. If a slave detects that the received Master Device ID does not match the slave's logical Device ID, the slave may determine that the Control Master is in a session with another slave. As such, the slave may cease writing data to the Control Block and enter its IDLE state until the Control Bus becomes available again. At that time, it may attempt to request the Control Bus again.

In an embodiment, the Control Bus may operate in a full duplex mode where the Control Master and a slave may engage in a bi-directional data transfer. In such an embodiment, the Master Control Source Register flag may denote when the Control Master has sent new data to the slave, and the Slave Control Source Register flag may denote when the slave has sent new data to the Control Master. Modifications to the control structure required to implement such an embodiment will be apparent from the disclosure contained herein to one of ordinary skill in the art.

In an embodiment, the Control Bus may include a plurality of data buffers. In such an embodiment, a transmit device (i.e, either the Control Master of a slave with which it is communicating) may initially write or more data buffers. When the receiving device processes data in one of the buffers, it may acknowledge receipt of that data. The transmitting device may then write new data to the acknowledged buffer. In this manner, data transfer may be expedited.

In an embodiment, multiple Control Buses may be implemented. In such an embodiment, the Control Master may communicate directly with a plurality of slave devices by assigning each slave to a particular Control Bus.

Additional and/or alternate methods of implementing a Control Bus architecture will be apparent to one or ordinary skill in the art based on the teachings and suggestions of the disclosed embodiments contained herein.

Clock Master

In an embodiment, one node may be designated as the Clock Master. The Clock Master may be responsible for synchronizing the nodes in a networking system. In an embodiment, the Clock Master may write a Clock Master Packet Length ("CMPL") denoting a reference time for the length of packets generated by the Clock Master in each outgoing data packet. In an embodiment, the CMPL may be a binary coded positive number with a fractional part. For example, the CMPL may be an 11-bit integer with a 4-bit fraction representing a number from 0 to 2047,9375. Other devices may use this fractional clock measurement to synchronize their clocks with the Clock Master.

Figure 10A:
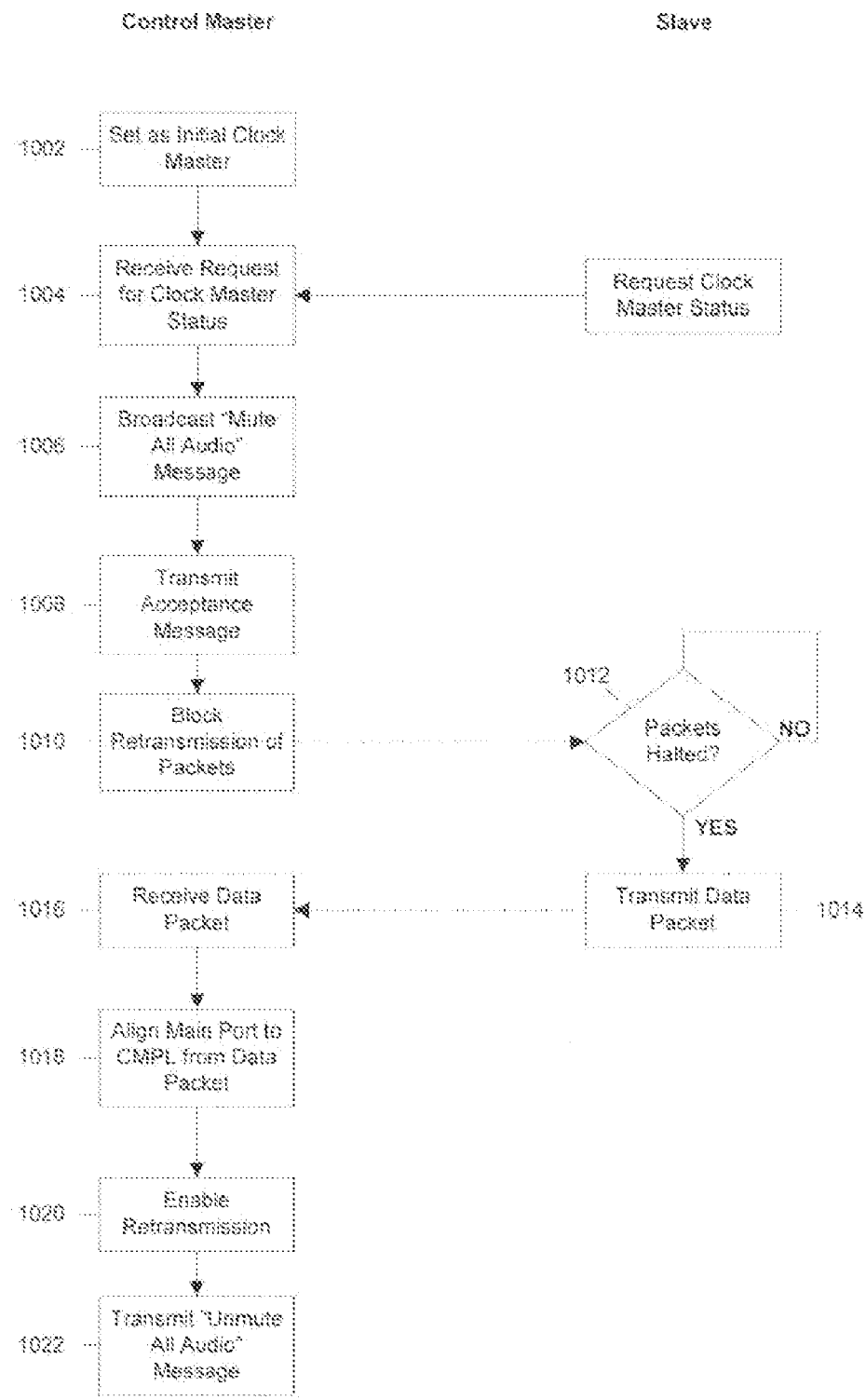
FIG. 10A depicts an exemplary Clock Master status transfer from the Control Master according to an embodiment.

FIG. 10A depicts an exemplary Clock Master status transfer according to an embodiment. As shown in FIG 10A, the Clock Master may be determined 1002 when the networking system is powered up. For example, the Control Master may initially be assigned as the Clock Master. If the Control Master received 1004 a request from a second device transfer the Clock Master status to the second device, the Clock Master may broadcast 1006 a "mute all audio" message to each node in the networking system and transmit 1008 an acceptance message to the second device. The Control Master may further block 1010 retransmission of all packets and stop transmitting the CMPL. Once all transmissions have been halted 1012, the new Clock Master may transmit 1014 a data packet including the CMPL for the new Clock Master. The Control Master, upon receiving 1016 the first data packet from the new Clock Master, may align 1018 its main port to the packet and enable 1020 retransmission. The Control Master may then broadcast 1022 an "unmute all radio" message to each node in the networking system.

The "mute all audio" and "unmute all audio" messages may be used to prevent unintended audio data from being output from the networking system. As such, the messages may prevent data corruption at the outputs and/or damage to the outputs of the node devices.

Figure 10B:
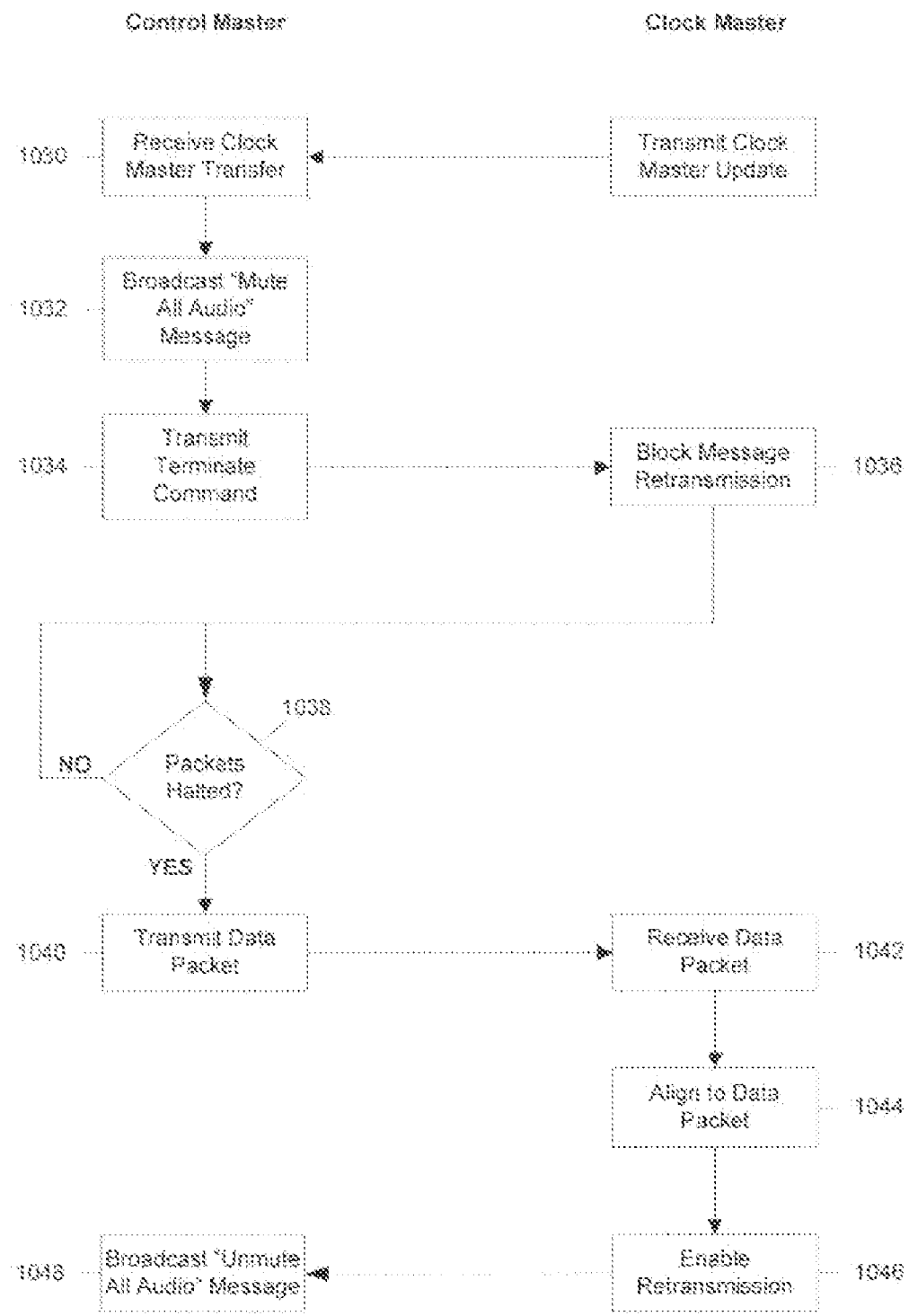
FIG. 10B depicts an exemplary Clock Master status transfer to the Control Master according to an embodiment.

A similar sequence of operations may be performed if the Control Master determines that the Clock Master should stop being the Clock Master. As shown in FIG. 10B, the Control Master may receive 1030 a request from an application or a user interface to have the Clock Master transfer control of the clock to the Control Master. The Control Master may broadcast 1032 a "mute all audio" message to each node in the networking system and transmit 1034 a command to terminate Clock Master status to the Clock Master. The Clock Master may then block 1036 retransmission of messages and stop transmitting the CMPL. Once all transmission have been halted 1038, the new Clock Master (i.e, the Control Master) may transmit 1040 a data packet including the CMPL. The old Clock Master, upon receiving 1042 the first data packet from the Control Master, may align 1044 its main port to the packet and enable 1046 retransmission. The Control Master may then broadcast 1048 an "unmute all audio" message to each node in the networking system. One reason for transferring the Clock Master to the Control Master may be if a user informs the Control Master that the Clock Master device is going to be removed from the networking system.

Figure 10C:
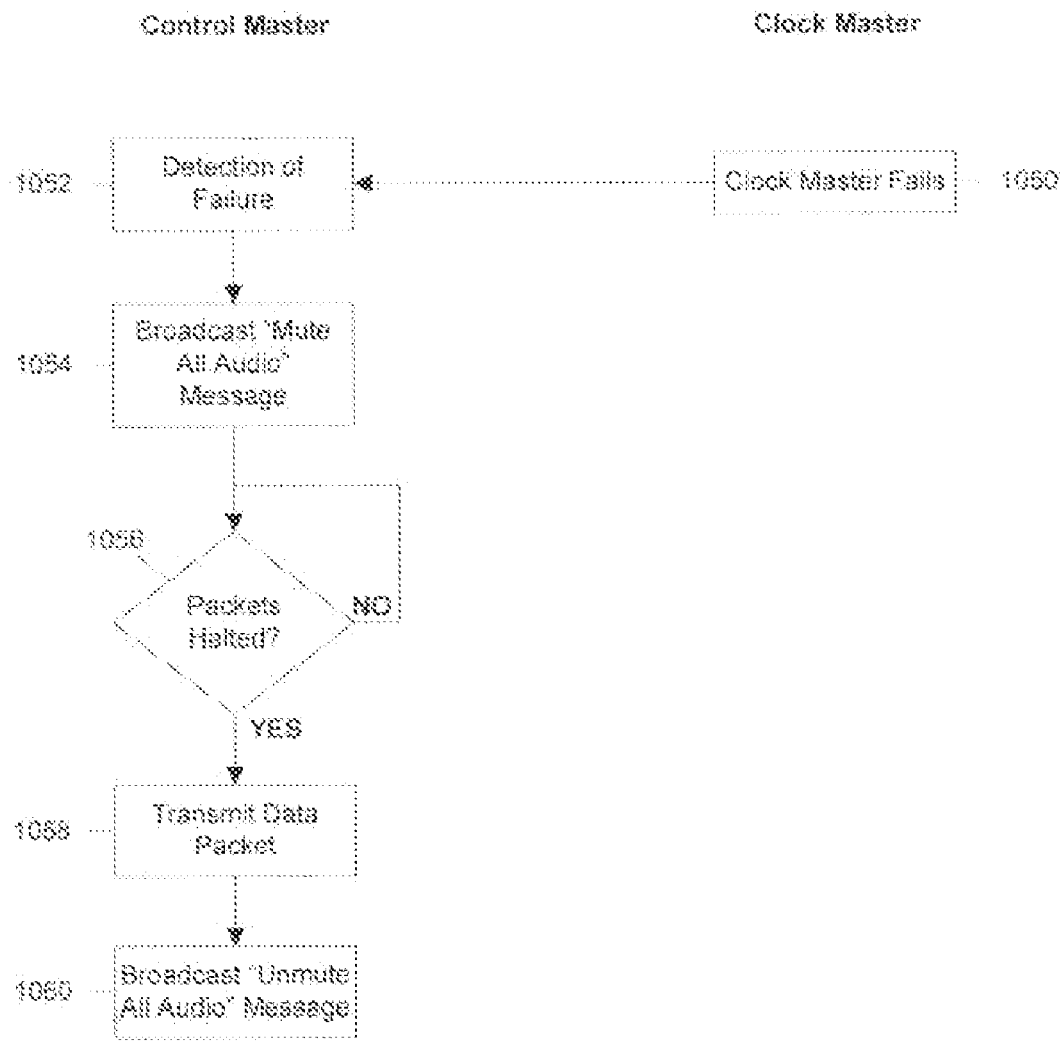
FIG. 10C depicts an exemplary Clock Master status recovery after a failure according to an embodiment.

If the Clock Master fails 1050, as shown in FIG. 10C the Control Master may detect 1052 the failure of the Clock Master, broadcast 1054 a "mute all audio" message and wait for the reception of packets containing the CMPL to be halted 1056. The Control Master may then start transmitting 1058 packets using its CMPL and broadcast 1060 an "unmute all audio" message to each node in the networking system.

Figure 10D:
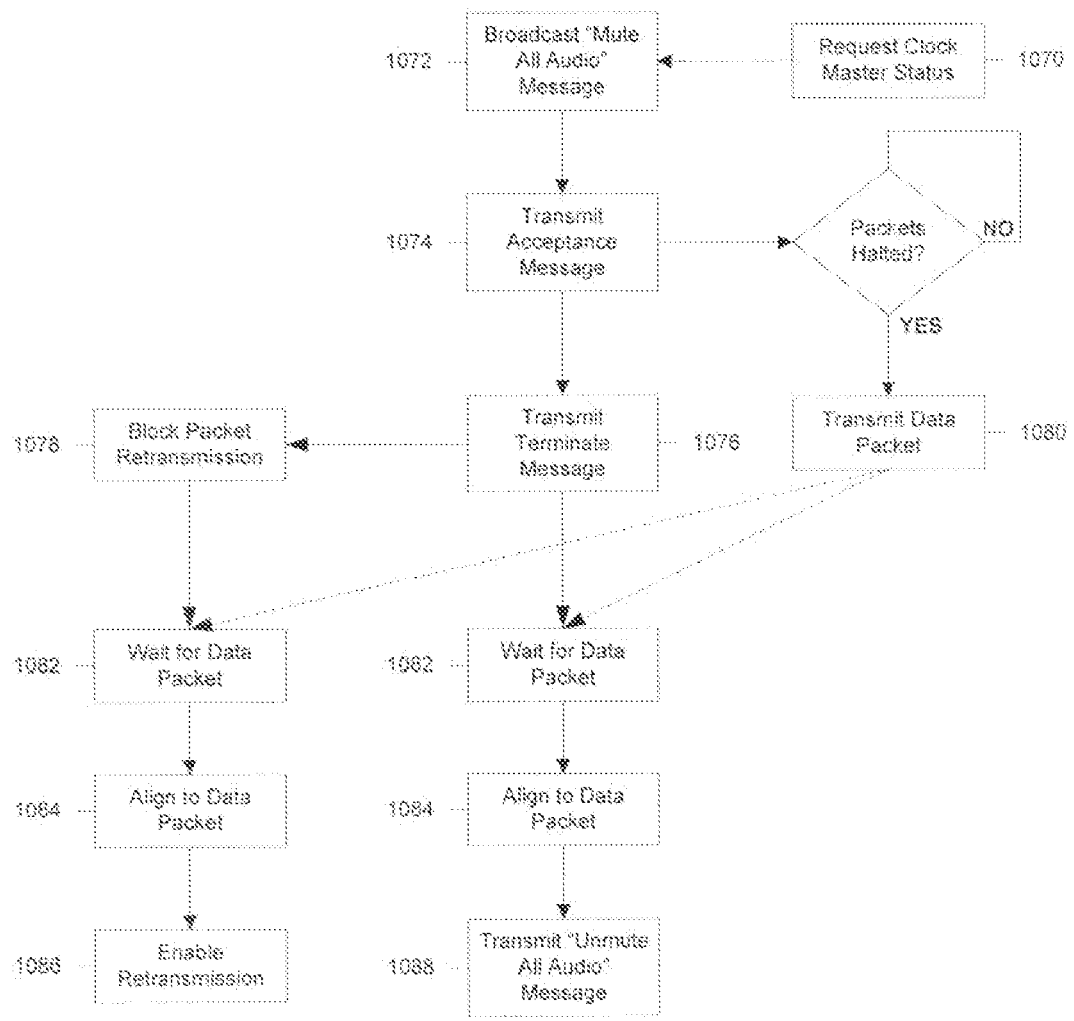
FIG. 10D depicts an exemplary Clock Master status transfer according to an embodiment.

As shown in FIG. 10D, the Control Master may also be used to transfer control from one slave device to a second slave device. Initially, a device may transmit 1070 to the Control Master requesting to be the new Clock Master. The Control Master may broadcast 1072 a "mute all audio" message to each node in the networking system, transmit 1074 an acceptance message to the new Clock Master, and transmit 1076 a message to terminate Clock Master status at the old Clock Master. The old Clock Master may block 1078 retransmission and stop transmitting its CMPL. The new Clock Master may start transmitting 1080 packets with the new CMPL, after the previous transmissions have halted. Each of the Control Master and the old Clock Master may wait 1082 for the first packet from the new Clock Master, and align 1084 their respective main ports to the packet. The old Clock Master may then enable 1086 retransmission, and the Control Master may broadcast 1088 an "unmute all audio" message to each node in the networking system.

Serial Bus Protocol

In an embodiment, a serial bus may be implemented including a plurality of dynamically assigned slots that provide a conduit for unidirectional channels of asynchronous serial communication. Each slot may be used for one or more of, for example, Musical Instrument Digital Interface (MIDI), RS-232 and General Purpose Input/Output (GPIO) data.

The serial bus may provide an interface for data between a physical hardware connection and a slot within the data packet. The interface may include, for example, a transmit section and a receive section. The transmit section may receive data through, for example, a MIDI-In port or an RS-232 port, or sample data at a GPIO input. The data may then be latched into a slot in the data packet. As the data is stored, a New Data Flag (corresponding to the serial slot in which the data was latched) may be toggled. The New Data Flag may permit a receiving device to determine when new data appears in the packet. In an embodiment, data may be verified by matching data received on, for example, 2 out of 3 consecutive packets. In an alternate embodiment, a CRC checksum may be performed.

The receive section may monitor the serial slot data for new data. If the data is valid, the receive packet processor may load the data if any New Data Flag has toggled. Valid data may then be passed to, for example, a GPIO output port or a UART output register for subsequent transmission of a RS-2323 or MIDI output port. In an embodiment, the data may be debounced and/or checked for redundancy prior to transmission.

Various input ports, such as MIDI-In, RS-232 Receive and GPIO Input, may be assigned to specific slots in the data packet. Once a particular port is assigned to a slot, any node in the networking system may access the data if the data is from a MIDI or GPIO input. If the data is from RS-232 Receive, the data may only be accessed by a particular destination node since RS-232 is a point-to-point protocol.

In an embodiment, the Control Master may maintain a table of all valid input port types. This table may contain, for example, a 16-bit entry that defines whether a particular data slot in the packet may be filled by data from a particular type of port. The table may be broadcast to all nodes in the networking system so that each node may identify slots that are available for insertion or monitoring. In an embodiment, the number of nodes in the networking system may exceed the number of serial data slots.

In an embodiment, a virtual data cable be associated with one or more slots in the data packet. A virtual data cable me be temporarily assigned to a node for serial data transmissions coming from that node. In an embodiment, a virtual data cable may include a plurality of serial data slots for direct communication between a plurality of nodes. The association of virtual data cables to slots in the data packet may be maintained by the nodes in the networking system. This information may then be used to route physical ports to packet slots.

Since each node may be provided with a relatively current map of the slots in use and the type of data being inserted into each slot, a user-interface on each node may present information to a user attempting to assign a box to insert or monitor a particular virtual data cable. In an embodiment, the node may permit the user to select only inactive serial data slots for data transmission into the data packet.

Once a node validates a virtual data cable request locally, a request may be sent form the node to the Control Master. If the node requests to insert data into a serial data slot, the Control Master may verify that the node is not attempting to insert data into a virtual data cable that has previously been assigned. The Control Master may further verify that a free data slot is available in the data packet. If these conditions are met, the Control Master may make the virtual data cable to data slot assignment and grant the virtual data cable to the requesting device. The Control Master may further inform the device of the physical slot that the device should use for insertion. The Control Master may then update the slot map and broadcast the updated map to each node in the networking system. Likewise, if a node no longer desires to use a slot, the Control Master may de-allocate the slot, update the slot map, and broadcast the updated map to each node in the networking system.

If the node wants to listen to a particular virtual data cable, the Control Master may acknowledge the request to the requesting node. However, the slot map need not be broadcast since a node that listens to a virtual data cable does not require any additional system resources.

Once the Control Master grants a virtual data cable to a node, the node may use the virtual data cable to transmit data. The virtual data cable assignment may be stored locally. In an embodiment, the assignment may be stored in a non-volatile memory on the node. By storing the assignment in non-volatile memory, the node may request that same virtual data cable each time that a system is powered up. The request in this case may be made after the node has been enumerated (as described above).

Since RS-232 is a bi-directional, point-to-point protocol, the networking system may be required to reserve two data slots for each RS-232 virtual data cable. In addition, the Control Master may be required to ensure that only two devices are assigned to the same RS-232 virtual data cable. The Control Master may also be responsible for assigning the receive and transmit sides of the RS-232 port. In other words, the Control Master may ensure that the nodes connected by a RS-232 virtual data cable do not attempt to insert data in the same data slot.

Auto Plug Detection

In a conventional system, stereo headphone amplifier circuits are designed for stereo headphones with Tip-Ring-Sleeve (TRS) plugs. Inserting a mono cable with a Tip-Sleeve (TS) plug into a stereo headphone jack that provides high current drive effectively shorts, for example, the right channel output directly to ground. This produces two undesirable effects: (1) the right channel output circuitry drives a high current to ground, which wastes power and damages the output circuitry; and (2) the right channel audio information is not presented to the output. Accordingly, TS plugs only receive information from the left channel in conventional systems. Conventional systems may provide a manual selection between mono and stereo modes. However, this requires diligence by the listener when inserting the plug into such a system.

In an embodiment, hardware and software may be used to automatically detect that a plug has been inserted into an audio system and the type of plug that has been inserted. Using this plug information, the system may make a decision as to whether to supply a mono output or a stereo output automatically. This may protect the output gain circuitry and provide a natural sounding mix when a stereo signal is routed to a mono listening device.

Figure 11:
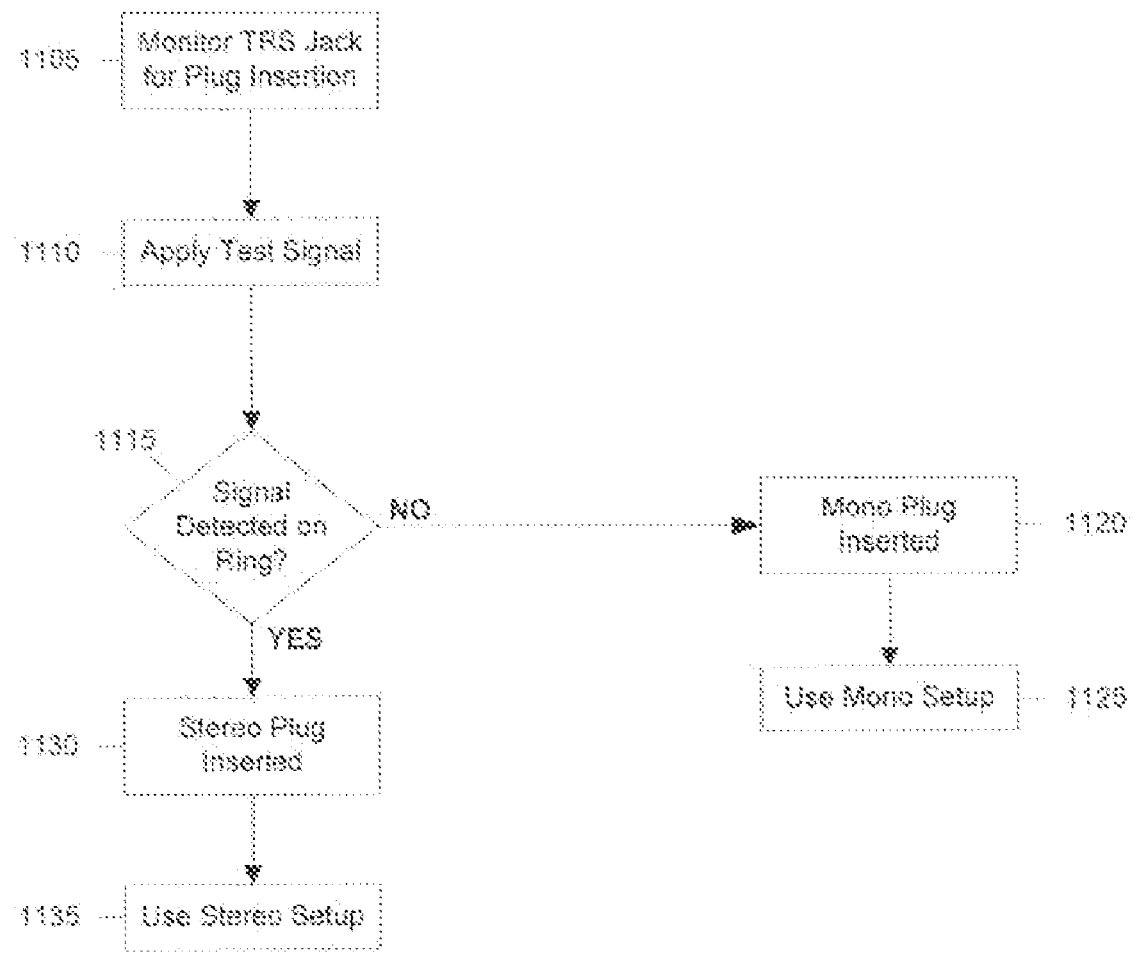
FIG. 11 depicts an exemplary flow diagram for a process of automatic plug detection according to an embodiment.

FIG. 11 depicts an exemplary flow diagram for a process of automatic plug detection according to an embodiment. As shown in FIG. 11, the unit may automatically detect when a plug is inserted into a TRS jack by monitoring 1105 a plug detect signal from the tip connector on the jack. This connector may normally be pulled to, for example, a low state. The state of this signal may change when a plug is inserted by triggering a switch connected to a pull-up. A processor may detect the change in the signal and recognize that a plug has been inserted. Debouncing may be performed on the plug detect signal to remove any anomalies that occur when a plug is inserted or removed. In an embodiment, no audio playback may be permitted until a plug has been inserted and measured.

When a new plug has been completely inserted, a determination whether the plug is mono or stereo may be performed 1110. In an embodiment, a heavily low-pass filtered, attenuated direct current signal may be transmitted to the Ring connector on the jack. For example, the signal may be filtered to about 6 Hz and may be about 350 mV in magnitude. Such a signal may be used to prevent an audible pop from coming through the inserted plug's headphones. Other signals may also be used within the scope of this disclosure.

The Ring connector may then be monitored 1115 to determine whether the signal is detected. If no signal is detected, the Ring connector may be determined to be shorted to the Sleeve connector (which is connected to ground), and it may be determined 1120 that a mono plug has been inserted. Otherwise, it may be determined 1130 that a stereo plug has been inserted since the Ring connector is not shorted to ground via the Sleeve connector.

In an embodiment, the Ring connector may be connected to a comparator. The other input to the comparator may be connected to a low voltage reference, such has about 30 mV, and the output of the comparator may be a stereo plug detect signal. Accordingly, if the resistance between the Ring connector and the Sleeve connector is greater than a threshold (i.e., not shorted to ground), the comparator may denote that a stereo plug has been inserted.

Digital processing of the output signal may then be performed based on the stereo plug detect signal. If a mono plug was detected, the output signal may transmit 1125 audio information substantially solely over the left channel, for example. This may create a mono signal that is balanced between the left and right input channel. It may also protect the output circuitry from high drive levels. In contrast, if a stereo plug was detected, the stereo input signal may be passed 1135 to the output circuitry.

The automatic plug detection algorithm may be performed at power up and any time a plug insertion is detected. Also, since the stereo settings of the unit are maintained in the digital domain and the plug detection logic is performed afterwards, the pan settings that are currently programmed into the component are overridden in the case of a mono plug. Since the auto-plug algorithm is performed "post-pan," the algorithm may not be required to make any changes to the user's pan setting. Accordingly, the logic may have no effect on the user's pan settings, either as displayed on the front panel or in preset memory. Internal pan settings may be maintained and the automatic rerouting of the audio signal using the algorithm described above may be transparent to the user.

LED Pulse Width Modulation

Light emitting Diode Pulse Width Modulation (LED PWM) may be used to limit the current used to drive LEDs in a device. In an embodiment, the LED PWM may be used on a matrix driving LEDs in a plurality of rows at a time. As used herein, the terms "lit" and "unlit" may refer to how an LED appears to a user. The terms "on" and "off" may refer to electrically driving current through an LED. If an LED is unlit, it may always be off. However, if an LED is lit, the current to that LED may pulse between of and off.

When a processing device determines that a specific LED should be lit, it may set a bit corresponding to the LED. An array of M×N LEDs may be used in a particular system. As such, these bits may be considered as a string of MN bits (the "LED bits"). The LED bits may be numbered from 1 to MN. LED bits may be processed sequentially within, for example, a given row from, for example, LED bit 1 to LED bit M, LED bit M+1 to LED bit 2M, etc.

In an embodiment, each LED that is supposed to be lit may only be on for a certain (relatively short) period of time because an LED that is driven at, for example, 5 mA may appear to a user to be just as bring as an LED driven at 50 mA with a 10% duty cycle. Accordingly, in an embodiment, each lit LED may be turned on for a short period of time. For an LED that is designated as being lit, it may actually be off most of the time. However, it may be drive with a relatively large current to make it appear.

Each lit LED may be turned on for a particular amount of time. When an LED is turned off, a minimum amount of time (referred to as the "LED dead time") may be required before the next LED bit is processed to prevent current bleed from one LED to another causing some LEDs to be inappropriately dimly lit. An LED timer may be used to determine the amount of time that an LED is turned on and off.

In an embodiment, if each LED has been processed prior to the expiration of a master cycle timer, the LED PWM process may halt until the master cycle timer has expired. This may reduce the current used by the LED PWM process.

In an embodiment, a number of rows scans that occur at one time may be determined by accessing a stored value. In an alternate embodiment, each row to be scanned may be represented by, for example, a bit stored in a memory. A table containing exemplary values for a memory location corresponding to particular scan rows is shown below. In an embodiment, writing a value to the memory location may initiate a row scan operation. An exemplary sequence of rows scanned in a particular pass is also displayed for each value in the table.

| # of Scan Rows | Row Scan Value | Row Scan Sequence |
| --- | --- | --- |
| 2 | 15'b000 0000 0000 0011 | 0-1, 2-3, 4-5, 6-7, 8-9, 10-11, 12-13, 14, repeat |
| 3 | 15'b000 0000 0000 0111 | 0-2, 3-5, 6-8, 9-11, 12-14, repeat |
| 4 | 15'b000 0000 0000 1111 | 0-3, 4-7, 8-11, 12-14, repeat |
| 5 | 15'b000 0000 0001 1111 | 0-4, 5-9, 10-14, repeat |
| 6 | 15'b000 0000 0011 1111 | 0-5, 6-11, 12-14, repeat |
| 7 | 15'b000 0000 0111 1111 | 0-6, 7-13, 14, repeat |
| 8 | 15'b000 0000 1111 1111 | 0-7, 8-14, repeat |
| 9 | 15'b000 0001 1111 1111 | 0-8, 9-14, repeat |
| 10 | 15'b000 0011 1111 1111 | 0-9, 10-14, repeat |
| 11 | 15'b000 0111 1111 1111 | 0-10, 11-14, repeat |
| 12 | 15'b000 1111 1111 1111 | 0-11, 12-14, repeat |
| 13 | 15'b001 1111 1111 1111 | 0-12, 13-14, repeat |
| 14 | 15'b011 1111 1111 1111 | 0-13, 14, repeat |
| 15 | 15'b111 1111 1111 1111 | 0-14, repeat |

The following pseudocode may represent the operations of an exemplary LED PWM scheme (as shown below, MIN[x, y] is equal to x if x<y and y otherwise):

```
row_min = 0
WHILE (1)
  Master Cycle Timer = MIN CYCLE TIME
  FOR (column = 1 to num_columns)
    FOR (row = row_min to MIN[row_min + scan_rows − 1, num_rows − 1])
      Turn on LED[row][column]
      LED Timer = LED ON TIME
      WHILE (LED timer ≠ 0)
      END WHILE
      FOR (row = row_min to MIN[row_min + scan_rows − 1, num_rows − 1])
        Turn off LED[row][column]
        LED Timer value = LED DEAD TIME
        WHILE (LED timer ≠ 0)
        END WHILE
      END FOR
    row_min = row_min + scan_rows
    IF (row_min ≥ num_rows)
      WHILE (Master Cycle Timer ≠ 0)
      END WHILE
```

```
    row_min = 0
  END IF
END WHILE
```

Figure 12:
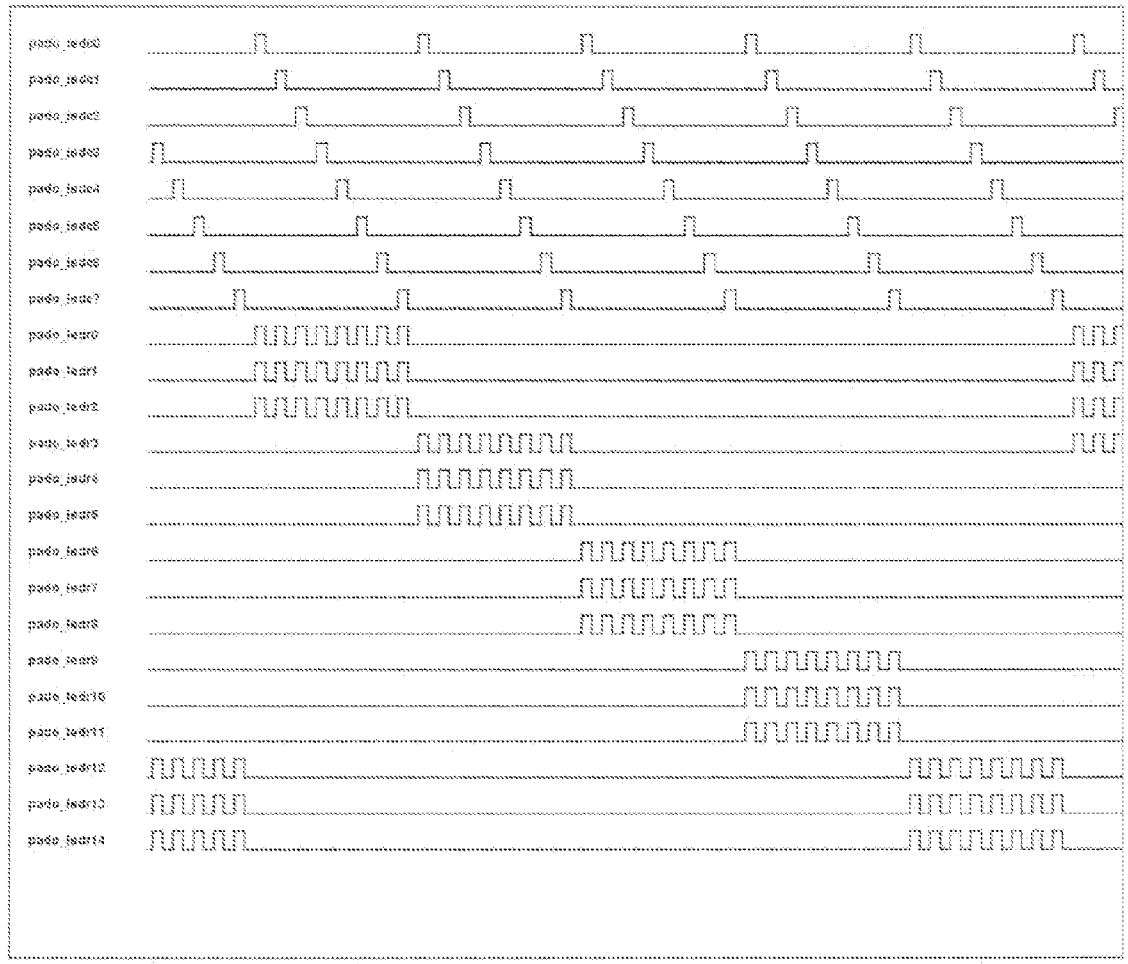
FIG. 12 depicts a timing diagram generated by an exemplary LED PWM scheme according to an embodiment.

FIG. 12 depicts a timing diagram generated by an exemplary LED PWM scheme according to an embodiment. As shown in FIG. 12, the LED array may have 8 columns (identified as pado_ledc[0:7]) and 15 rows of LEDs (identified as pado_ledr[0.14]). In an embodiment, if the column and row enables are both high, the LED at the corresponding column and row may be driven, if required. For example, as shown in FIG. 12, the first enabled grouping of LEDs written are at column 3 and rows 12-14.

Alternate methods of performing a LED PWM scheme that scans a plurality of rows at a time may be performed and will be apparent to those of ordinary skill in the art based on the teachings disclosed herein.

It will be appreciated that variations of the above-described and other features and functions, or alternatives thereof, may be desirable combined into may other different systems or applications. It will also be appreciated that various presently unforeseen or unanticipated alternatives, modifications, variations or improvements therein may be subsequently made by those of ordinary skill in the art which are also intended to be encompassed by the following claims.

What is claimed is:

1. A method for synchronously transmitting control data from a master device to one of a plurality of slave devices in a streaming data network, the method comprising:
   inserting, by the master device, an a first identifier identifying the slave device and a second identifier identifying a request to start transmission into a transmit data stream transmitted over a streaming data network:
   receiving, from the slave device, a first acknowledgment via a receive data stream;
   inserting, by the master device, at least a portion of the control data into the transmit data stream at least until a second acknowledgement is received from the slave device via the receive data stream;
   repeating the inserting at least a portion of the control data into the transmit data stream until second inserting step until all of the control data has been transmitted to the slave device; and
   removing, by the master device, the second identifier from the transmit data stream when a third acknowledgment is received from the slave device via the receive data stream.

2. The method of claim 1 wherein inserting a first identifier identifying the slave device comprises inserting the first identifier in a first field.

3. The method of claim 2 wherein receiving a first acknowledgment comprises receiving data from the receive data stream in which the first identifier is present in the first field and a second field, wherein the second field is writeable by the slave device.

4. A method of synchronously transmitting control data from one of a plurality of slave devices to a master device in a streaming data network, the method comprising:
   inserting, by a slave device, a first identifier identifying the slave device and a second identifier identifying a request to start transmission into a transmit data stream transmitted over a streaming data network;
   receiving, from the master device, a first acknowledgement via a receive data stream; determining whether the first acknowledgment identifies the slave device; if not, removing the first identifier from the transmit data stream; and if so:
   inserting, at the slave device, at least a portion of the control data into the transmit data stream at least until a second acknowledgement is received via the receive data stream,
   repeating the inserting at least a portion of the control data into the transmit data stream until all of the control data has been transmitted to the master device, and
   removing the second identifier from the transmit data stream when a third acknowledgment is received via the receive data stream.

5. The method of claim 4 wherein inserting a first identifier identifying the slave device comprises inserting the first identifier in a first field.

6. The method of claim 5 wherein determining whether the first acknowledgment identifies the slave device comprises determining whether the first identifier is present in the first field and a second field, wherein the second field is writeable by the master device.

7. A system for synchronously transmitting control data in a streaming data network, the system comprising:
   a master device, comprising:
   a master data receiving module for receiving a receive data stream, and
   a master data insertion module for:
      inserting a first identifier identifying a slave device and a second identifier identifying a request to start transmission into a transmit data stream transmitted over the streaming data network, and
      inserting, once a first acknowlegment has been received via the receive data stream and while at least some control data has not been transmitted, at least a portion of the control data into the transmit data stream until a second acknowledgement is received via the receive data stream,
      removing the second indentifier from the transmit data stream when a third acknowledgement is received via the receive data stream; and
   one or more slave devices wherein each slave device comprises:
   a slave data receiving module for receiving the transmit data stream, and
   a slave data insertion module for:
      inserting the first acknowledgment into the receive data stream if the first identifier identifying the slave device is received from the transmit data stream, and
      inserting the second acknowledgment into the receive data stream if data is received via the transmit data stream.

8. The system of claim 7 wherein the master data insertion module inserts the first identifier identifying a slave device in a first field of the transmit data stream.

9. The system of claim 8 wherein the slave data insertion module inserts the first acknowledgment in a second field of the receive data stream, wherein the first acknowledgment comprises the first identifier identifying the slave device.

10. The system of claim 8 wherein:
   the master data insertion module further removes the first identifier identifying the slave device after all of the control data has been transmitted, and
   the slave data insertion module further inserts a third acknowledgment into the receive data stream after the first identifier identifying the slave is no longer received.

11. A system for synchronously transmitting control data in a streaming data network, the system comprising one or more slave devices and a master device,
wherein each slave device comprises:
a slave data receiving module for receiving a receive data stream, and
a slave data insertion module for:
inserting a first identifier identifying the slave device and a second identifier identifying a request to start transmission into a transmit data stream transmitted over the streaming data network,
inserting, if a first acknowledgment identifying the slave device has been received from the master device via the receive data stream and while at least some control data has not been transmitted, at least a portion of the control data into the transmit data stream until a second acknowledgement is received from the master device via the receive data stream, and
removing, if a third acknowledgement has been received via the receive data stream, the second acknowledgement; and
wherein the master device comprises:
a master data receiving module for receiving the transmit data stream, and
a master data insertion module for:
inserting the first acknowledgment into the receive data stream if the first identifier identifying a slave device is received from the transmit data stream, and
inserting the second acknowledgment into the receive data stream if a portion of control data is received from the transmit data stream.

12. The system of claim 11 wherein the slave data insertion module inserts the first identifier identifying the slave device in a first field of the transmit data stream.

13. The system of claim 12 wherein the master data insertion module inserts the first acknowledgment in a second field of the receive data stream, wherein the first acknowledgment comprises the first identifier received from the transmit data stream.

14. The system of claim 11, wherein:
the slave data insertion module further removes the first identifier identifying the slave device after all of the control data has been transmitted, and
the master data insertion module further inserts a third acknowledgment into the receive data stream after the first identifier identifying the slave is no longer received.

* * * * *

UNITED STATES PATENT AND TRADEMARK OFFICE
CERTIFICATE OF CORRECTION

PATENT NO.         : 7,526,526 B2
APPLICATION NO.    : 11/538600
DATED              : April 28, 2009
INVENTOR(S)        : Robert P. Clemens and John S. Garczynski, Jr.

Page 1 of 1

It is certified that error appears in the above-identified patent and that said Letters Patent is hereby corrected as shown below:

ON TITLE PAGE, Item 75: The second inventor's name listed as "John G. Garczynski, Jr." should read --John S. Garczynski, Jr.--.

Column 14, Line 34 "Bolck" should read --Block--.
Column 23, Line 10 "not" should read --no--.
Column 23, Line 11 "Master/Salve" should read --Master/Slave--.
Column 23, Line 15 "determined" should read --determine--.
Column 23, Line 15 "BRGNT" should read --BGRNT--.
Column 23, Line 28 "salve" should read --slave--.
Column 23, Line 37 "BRGNT" should read --BGRNT--.
Column 24, Line 19 "Salve" should read --Slave--.
Column 24, Line 55 "asnychornous" should read --asynchronous--.
Column 25, Line 23 "write or more" should read --write one or more--.
Column 31, Line 33 "an a first" should read --a first--.

Signed and Sealed this

Seventh Day of July, 2009

JOHN DOLL
*Acting Director of the United States Patent and Trademark Office*